US011678661B2

(12) United States Patent
Zhu et al.

(10) Patent No.: US 11,678,661 B2
(45) Date of Patent: Jun. 20, 2023

(54) THICKENED ORGANIC LIQUID COMPOSITIONS WITH POLYMERIC RHEOLOGY MODIFIERS

(71) Applicant: NOURYON CHEMICALS INTERNATIONAL B.V., Arnhem (NL)

(72) Inventors: Shawn Zhu, Stormville, NY (US); John Socrates Thomaides, Berkeley Heights, NJ (US); Andrew Richard Boracci, Wappingers Falls, NY (US); Anthony John Adamo, Flagtown, NJ (US); Diane Principe-Frank, Woodbridge, NJ (US); Qiwei He, Belle Mead, NJ (US); John M. Morales, Warren, NJ (US)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 464 days.

(21) Appl. No.: 16/473,738

(22) PCT Filed: Dec. 21, 2017

(86) PCT No.: PCT/EP2017/084223
§ 371 (c)(1),
(2) Date: Jun. 26, 2019

(87) PCT Pub. No.: WO2018/122122
PCT Pub. Date: Jul. 5, 2018

(65) Prior Publication Data
US 2022/0267493 A1 Aug. 25, 2022

Related U.S. Application Data

(60) Provisional application No. 62/439,979, filed on Dec. 29, 2016, provisional application No. 62/439,993, filed on Dec. 29, 2016.

(30) Foreign Application Priority Data

Mar. 7, 2017 (EP) .................................. 17159554
Mar. 7, 2017 (EP) .................................. 17159558

(51) Int. Cl.
*A01N 25/04* (2006.01)
*C08F 220/18* (2006.01)
*C09K 23/36* (2022.01)

(52) U.S. Cl.
CPC ........ *A01N 25/04* (2013.01); *C08F 220/1811* (2020.02); *C09K 23/36* (2022.01); *C08F 220/1812* (2020.02)

(58) Field of Classification Search
CPC .................................................... A01N 25/04
See application file for complete search history.

(56) References Cited

U.S. PATENT DOCUMENTS

| 4,102,945 | A | 7/1978 | Gleave |
| 5,874,512 | A | 2/1999 | Farley et al. |
| 6,586,097 | B1 | 7/2003 | Pascault et al. |
| 8,580,287 | B2 * | 11/2013 | Merlet .................. A01N 25/04 424/405 |
| 2005/0233906 | A1 | 10/2005 | Schnabel et al. |
| 2008/0171658 | A1 | 7/2008 | Dyllick-Brenzinger et al. |
| 2012/0208700 | A1 | 8/2012 | Hopkins et al. |
| 2016/0184211 | A1 | 6/2016 | Debeaud et al. |

FOREIGN PATENT DOCUMENTS

| CN | 1203605 A | 12/1998 |
| CN | 104093807 A | 10/2014 |
| DE | 2731937 A1 | 7/1978 |
| EP | 1 576 947 A1 | 9/2005 |
| EP | 2 218 328 A1 | 8/2010 |
| EP | 2 455 061 A1 | 5/2012 |
| EP | 2 987 405 A1 | 2/2016 |
| JP | 2014-080377 A | 5/2014 |
| JP | 2014-091735 A | 5/2014 |
| RU | 2369093 C2 | 10/2009 |
| WO | 2006/098156 A2 | 9/2006 |
| WO | 2009/004281 A2 | 1/2009 |
| WO | 2011/139647 A2 | 11/2011 |
| WO | 2012/065991 A1 | 5/2012 |
| WO | 2012/167322 A1 | 12/2012 |
| WO | 2012/170419 A2 | 12/2012 |
| WO | 2014/169363 A1 | 10/2014 |
| WO | 2015/145105 A1 | 10/2015 |
| WO | 2016/096627 A1 | 6/2016 |
| WO | 2016/096660 A1 | 6/2016 |
| WO | 2016/188839 A1 | 12/2016 |

OTHER PUBLICATIONS

Eospoly Sun Cream, Cosmetics Innovations & Technologies, Mar. 2008, p. 1, XP002659382, Retrieved from the Internet: URL:http://www.creationscouleurs.com/formu.
European Search Report issued in counterpart European Application No. 17159554.9 dated Aug. 25, 2017.
Notification of Transmittal of the International Search Report and the Written Opinion of the International Searching Authority, or the Declaration from the International Bureau of WIPO for International Application No. PCT/EP2017/084223 dated Mar. 2, 2018.

* cited by examiner

*Primary Examiner* — Nizal S Chandrakumar
(74) *Attorney, Agent, or Firm* — Lorenz & Kopf, LLP

(57) ABSTRACT

Disclosed are thickened organic liquid compositions comprising an organic liquid and a polymeric rheology modifier wherein the polymeric rheology modifier is obtainable by co-polymerizing at least two of a bicyclic (meth)acrylate ester, an alkyl (meth)acrylate, and an aromatic vinyl monomer. Also disclosed are thickened organic liquid dispersions with suspended solids and methods of stabilizing dispersions using polymeric rheology modifiers.

20 Claims, No Drawings

THICKENED ORGANIC LIQUID COMPOSITIONS WITH POLYMERIC RHEOLOGY MODIFIERS

This application is a national stage filing under 35 U.S.C. § 371 of PCT/EP2017/084223, filed Dec. 21, 2017, which claims priority to U.S. Patent Application Nos. 62/439,979 and 62/439,993, both filed Dec. 29, 2016, and European Patent Application Nos. 17159554.9 and 17159558.0, both filed Mar. 7, 2017, the contents of which are each incorporated herein by reference in their entireties.

FIELD OF THE DISCLOSURE

The invention relates to the use of polymeric rheology modifiers with organic liquids, thickened compositions comprising organic liquids and polymeric rheology modifiers, and to methods of stabilizing organic liquid dispersions using polymeric rheology modifiers.

BACKGROUND

Polymers have previously been used for modifying the rheology of a fluid by incorporation of the polymer. There is a need for polymers that can be used to adjust the thickness, viscosity, and other properties of fluid compositions, particularly organic liquid compositions used in formulations such as agrochemical formulations.

Many organic liquids have low viscosity. Organic liquids with low viscosities create formulation, handling and application difficulties in various applications. Therefore, organic liquids need to be thickened to suit various applications.

Thickened organic liquid compositions have many uses in various industries. One example is an oil painting medium that requires different viscosities to give different "layering effects." Another example is gelled teak oil. Gelled teak oil exhibits improved performance than normal teak oil because the gel keeps the oil stationary for a prolonged time to allow the wood to absorb it fully. This improved performance allows a single coat of gelled teak oil to penetrate deeper into the wood than normal teak oil, leaving furniture more uniform in color and ultimately increases the life of the wood. Still another example is air freshener liquid distributed using a reed. The fragrance material in the container of the air freshener typically consists of low viscosity essential oils mixed with low viscosity diluents. Thickening the low viscosity material in such an air freshener reduces spillage and loss of liquid through evaporation.

Another example is the suspension of solid particles in thickened organic liquids. The solid particles can be agrochemicals, pigments, sand, cutting debrides in oil field operations, and so on. A special application is in the agricultural industry. Many agrochemicals are supplied as powders and they have handling and dust issues. It is desirable to provide suspensions (i.e., liquid formulations of solid agrochemicals suspended in a liquid) for farmers or applicators to use. A liquid formulation has several advantages over a solid formulation, such as ease of handling, ability to pump and spray, and reduction of dust issues. Currently most of the liquid suspensions are aqueous suspension concentrates (SC) due to cost consideration. However, aqueous suspension concentrates are not suitable for water sensitive pesticide active ingredients and are usually not suitable for multi-active formulations. Suspensions of water sensitive active pesticides in carefully selected organic liquids can avoid these problems. The organic liquids typically have to be thickened to have suspension ability.

Thickened organic liquid compositions are useful to construct formulations such as oil dispersions (OD) using the organic liquids as later defined herein.

An OD formulation, also called oil flowables, oil concentrates, and oil suspension concentrates, typically is a thickened oil composition containing suspended solid particles comprising one or more organic liquids, one or more powders with low solubility in the organic liquids, optionally one or more emulsifiers capable of emulsifying the organic liquids into water, and other additives such as a dispersant, a thickener, or a defoamer. The organic liquids are generally low polarity organic liquids. Without a thickener, the liquid formulation usually is unstable because the powder tends to separate from the OD due to density difference. Current rheology modifiers used in OD formulations include organoclay, silicas, Intelimer 13-6, dextrin palmitate, and hydrogenated castor oil derivatives. All of these thickeners have drawbacks. They are difficult to handle (too dusty), require heating or a protonic solvent to activate thickening, or work only with one type of oil.

One particularly important organic liquid is a low polarity organic liquid such as fatty acid ester. The use of fatty acid esters (especially vegetable fatty acid esters) as the organic liquid in the thickened oil compositions has certain advantages because fatty acid esters are from a reasonably-priced renewable plant or animal source and are chemically inert to other chemicals dissolved or suspended in it. In addition, fatty acid esters have lower viscosity than their oil counterparts, permitting higher solid particle loading without the formulations becoming too thick to pump. Moreover, fatty acid esters are known to have the ability to enhance the efficacy of various pesticides. Even with these advantages, however, fatty acid esters have not seen wide spread use in industries such as agrochemical applications due to the difficulty in preparing thickened organic liquid compositions or stable OD formulations. The main difficulty to thicken a fatty acid ester (such as a vegetable fatty acid methyl ester), or any organic liquid, is the lack of an effective thickener for fatty acid esters or organic liquids.

There exists a need for alternative rheology modifiers with the ability to thicken organic liquids or to use a thickened organic liquid to stabilize solid particles in organic liquids with improved effectiveness over previously known thickeners and at a reasonable cost. Preferably, the alternative rheology modifiers can thicken many organic liquids.

SUMMARY

We have unexpectedly discovered that a group of polymeric rheology modifiers made from two or more monomers selected from a bicyclic (meth)acrylate ester, an alkyl (meth)acrylate, and an aromatic vinyl monomer show surprisingly improved and efficient thickening ability in organic liquids.

In a first aspect, the disclosure provides a thickened organic liquid composition comprising an organic liquid and a polymeric rheology modifier, wherein the organic liquid is substantially free of petroleum based fuels, and wherein the polymeric rheology modifier is obtainable by co-polymerizing a monomer mixture comprising at least one alkyl (meth)acrylate and at least one of the following monomers:
a bicyclic (meth)acrylate ester different from the alkyl (meth)acrylate, and an aromatic vinyl monomer.

Preferably in the first aspect, the polymeric rheology modifier comprises 5 to 50 wt % bicyclic (meth)acrylate ester, 25 to 70 wt % alkyl (meth)acrylate, and 10 to 40 wt % aromatic vinyl monomer.

In another embodiment, the polymeric rheology modifier comprises 20 to 70 wt % bicyclic (meth)acrylate ester, and 30 to 80 wt % alkyl (meth)acrylate. In an embodiment, the bicyclic (meth)acrylate ester is isobornyl methacrylate, the alkyl (meth)acrylate is isobutyl methacrylate, and the aromatic vinyl monomer is styrene.

In a second aspect, the disclosure provides a thickened organic liquid composition comprising an organic liquid and a polymeric rheology modifier wherein the alkyl (meth)acrylate is a lower alkyl (meth)acrylate and/or a fatty alkyl (meth)acrylate and the polymeric rheology modifier is obtainable by co-polymerizing at least two of the following monomers:
  a bicyclic (meth)acrylate ester,
  a lower alkyl (meth)acrylate,
  a fatty alkyl (meth)acrylate, and
  an aromatic vinyl monomer.

Preferably in the second aspect, the polymeric rheology modifier comprises 10 to 30 wt % bicyclic (meth)acrylate ester, 10 to 25 wt % lower alkyl (meth)acrylate, 30 to 40 wt % fatty-alkyl (meth)acrylate, and 15 to 30 wt % aromatic vinyl monomer. In an embodiment, the bicyclic (meth)acrylate ester is isobornyl methacrylate, the lower alkyl (meth)acrylate is isobutyl methacrylate, the fatty alkyl (meth) acrylate is lauryl methacrylate and the aromatic vinyl monomer is styrene.

In a third aspect, the disclosure provides a thickened organic liquid composition comprising an organic liquid and a polymeric rheology modifier wherein the viscosity of the thickened organic liquid composition is at least 150 mPas, preferably at least 300 mPas, more preferably at least 600 mPas, and still more preferably at least 1000 mPas measured by a Brookfield viscometer at 10 rpm at 22 C. Preferably, the amount of rheology modifier in the organic liquid having these viscosities is less than 15 wt %.

In a fourth aspect, the disclosure provides a thickened organic liquid composition comprising an organic liquid and a polymeric rheology modifier wherein the polymeric rheology modifier further comprises a cross-linking monomer in the amount of between about 20 ppm to about 2000 ppm, preferably about 200 ppm to about 1500 ppm, more preferably between 300 ppm and 1000 ppm, more preferably about 350 ppm to about 650 ppm. Preferably, the cross-linking monomer is a di-functional or multifunctional (meth)acrylate monomer, such as 1,6-hexanediol di(meth)acrylate or trimethylolpropane triacrylate. In an embodiment, the fourth aspect further comprises solid particles wherein the solid particles are suspended in the organic liquid.

In a fifth aspect, the disclosure provides a thickened organic liquid composition comprising an organic liquid, a polymeric rheology modifier and an emulsifier. Preferably in the fifth aspect the composition is not a cosmetic composition.

In a sixth aspect, the disclosure provides a thickened organic liquid composition comprising an organic liquid, a polymeric rheology modifier, an emulsifier, and a solid agrochemical.

In a seventh aspect, the disclosure provides a method of improving stability of an agrochemical formulation by dissolving the polymer rheology modifier into an organic liquid and adding a solid agrochemical.

DETAILED DESCRIPTION

In this disclosure all weight percentages are stated as based on the total weight of the formulation unless stated otherwise.

For the purposes of the current disclosure, the thickened organic liquid compositions are stable when the compositions (1) possess less than 10% volume separation after 2 weeks storage at 50° C.-54° C., after 4 weeks storage at 40° C., or after 3 months storage at room temperature; or (2) remain a homogenous liquid after three cycles of freeze-thaw; or (3) if separation does occur, the formulations are able to return to a smooth appearance after gentle mixing. For purposes of this disclosure, gentle mixing means inverting a 100 ml container (holding an 85 ml sample) 15 times.

In the context of this disclosure, the term "(meth)acrylate" refers to acrylate and methacrylate.

In the context of the disclosure the term "(co)polymer" indicates polymer or copolymer. The term "polymer" and the term "copolymer" are used herein interchangeably.

In the context of this disclosure, the term "substantially free of" in the context of a formulation means that the formulation contains less than 10 wt %, or less than 5 wt %, or less than 4 wt %, or less than 3 wt %, or less than 2 wt % or less than 1 wt %, of the indicated ingredient on basis of the total weight of the formulation. The term "substantially free of" in the context of a polymer or co-polymer means that the polymer contains less than 10 wt %, or less than 5 wt %, or less than 4 wt %, or less than 3 wt %, or less than 2 wt % or less than 1 wt %, of the indicated ingredient on basis of the total weight of the polymer.

For the purposes of this disclosure, for organic liquids with a viscosity of less than 100 mPas, thickening a composition means to increase the viscosity of the modified liquid by at least 5 times, preferably 10 times, more preferably at least 20 times, and more preferably at least 50 times in the presence of 3 wt % or less of the polymeric rheology modifier compared to the same fluid in the absence of the polymeric rheology modifier. For organic liquids with a viscosity above 100 mPas, thickening means to increase the viscosity of the modified liquid by at least 50 mPas, preferably 100 mPas, more preferably 200 mPas, more preferably 500 mPas, more preferably 1000 mPas and more preferably 500 mPas. In most cases described herein, the viscosity of the organic liquid is less than 100 mPas and is Newtonian.

In this disclosure the term "viscosity" means Brookfield viscosity measured by Brookfield viscometers at 10 rpm at 22° C., unless stated otherwise. Viscosity was measured using a Brookfield DV-II+ Viscometer or a Brookfield DV-I Prime Viscometer as indicated in the examples below.

As used herein, shear-thinning refers to non-Newtonian fluids which have decreased viscosity when subjected to shear strain. For the purposes of the current disclosure, formulations have strong shear thinning property if the viscosity ratio of the formulation at 10 rpm and 100 rpm is greater than 2 as measured by a Brookfield viscometer. For a stable suspension formulation in our examples, the viscosity ratio is greater than 2, and typically greater than 2.5.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from different aspects and embodiments of the invention. It will also be appreciated that features within the aspects and embodiments of the invention can be excluded from other features within the aspects and embodiments and remain within the scope of the invention.

The term "consisting" wherever used herein also embraces "consisting substantially", but may optionally be limited to its strict meaning of "consisting entirely". Further, throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise. Where upper and lower limits are quoted for a property, for example for the percentage of monomer contained within the polymer, then a range of values defined by a combination of any of the upper limits with any of the lower limits is also implied.

The Polymeric Rheology Modifiers

For the polymeric rheology modifiers of the disclosure to be suitable for modifying the rheology of an organic liquid containing the polymer, the polymer is preferably soluble in said fluid. In the context of the present disclosure, a polymer is soluble in a fluid if at least 3 wt % of polymer can be dissolved in the organic liquid. Solubility can be determined by adding 3 wt % of a polymer to a fluid and observing the fluid with the naked eye. The fluid with dissolved polymer will be clear or have a slight translucent color or turbidity in it due to light scattering, but will not contain detectable polymer particles or a separate polymer-rich phase.

The bicyclic (meth)acrylate ester of the disclosure contains a (meth)acryloyl radical bonded to a six-membered carbon atom bridged ring and said group of monomers include products like decahydronaphthyl (meth)acrylates, and adamantyl (meth)acrylates, but preferred are products according to formula (I)

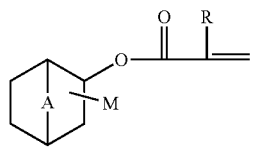

wherein
R is H or —CH$_3$,
A is —CH$_2$—, —CH(CH$_3$)— or —C(CH$_3$)$_2$—, and one or more M is covalently bonded to any carbon of the bicyclic rings, preferably to a carbon atom of the six-membered ring, and is selected from the group consisting of hydrogen, halogen, methyl and methylamino group or a plurality thereof. Non-limiting examples of the bicyclic (meth)acrylate esters include isobornyl (meth)acrylate, bornyl (meth)acrylate, fenchyl (meth)acrylate, isofenchyl (meth)acrylate, norbornyl (meth)acrylate, cis, (endo) 3-methylamino-2-bornyl (meth)acrylate, 1,4,5,6,7,7-hexachlorobicyclo[2.2.1]-hept-5-ene-2-ol (meth)acrylate (HCBOMA) and 1,4,5,6,7,7-hexachlorobicyclo[2.2.1]-hept-5-ene-2 methanol (meth)acrylate (HCBMA), and mixtures of such bicyclic (meth)acrylates. Preferably the bicyclic (meth)acrylate ester of the disclosure is a bridged bicyclic (meth)acrylate ester. For purposes of this disclosure, a bridged bicyclic monomer means a monomer with two rings that share three or more atoms, separating the two bridgehead atoms by a bridge containing at least one atom. A suitable bicyclic (meth)acrylate ester is isobornyl methacrylate. The bicyclic (meth)acrylate esters are known per se and may be prepared in known fashion or may be obtained from commercial sources. The bicyclic (meth)acrylate is preferably chosen from monomers which, when polymerized, form a homopolymer that is soluble in many organic liquids including fatty acid esters, and combinations of different organic liquids.

Alkyl (meth)acrylates of the disclosure include lower alkyl (meth)acrylates, fatty-alkyl (meth)acrylates and mixtures thereof. In an embodiment, the alkyl (meth)acrylates are linear or branched. In an embodiment, the alkyl (meth) acrylates are substituted or unsubstituted.

Lower alkyl (meth)acrylates of the disclosure are compounds wherein a (meth)acryloyl radical is bonded to C1-C6 alkyl group, which can be linear or branched, substituted or unsubstituted, saturated or unsaturated. Lower alkyl (meth) acrylates of the disclosure include compounds such as methyl (meth)acrylate, ethyl (meth)acrylate, propyl (meth)acrylate, butyl (meth)acrylate, isobutyl (meth)acrylate, pentyl (meth)acrylate, isopentyl (meth)acrylate and hexyl (meth) acrylate.

A preferred lower alkyl (meth)acrylate is isobutyl (meth)acrylate. The lower alkyl (meth)acrylate is preferably chosen from monomers which, when polymerized, form a homopolymer that is soluble in organic liquids, and combinations of different organic liquids. When the homopolymer that is formed from the lower alkyl methacrylate is not soluble in organic liquids, the amount of this monomer in the polymeric rheology modifier is preferably limited to less than about 60%, more preferably less than 50% and more preferably less than about 40% by weight.

The fatty-alkyl (meth)acrylates of the disclosure are compounds wherein a (meth)acryloyl radical is bonded to a fatty alkyl group, herein defined as a C8-C24 alkyl group, which can be linear or branched substituted or unsubstituted, saturated or unsaturated. Examples of a fatty alkyl (meth) acrylate include 2-ethylhexyl (meth)acrylate, decyl (meth)acrylate, isodecyl (meth)acrylate, lauryl (meth)acrylate, methacrylic ester 13.0 (CAS #: 90551-76-1), tetradecyl (meth)acrylate, hexadecyl (meth)acrylate, methacrylic ester 17.4 (CAS #: 90551-84-1), and stearyl (meth)acrylate. Preferred fatty-alkyl (meth)acrylates are chosen from monomers which, when polymerized, form a homopolymer which is soluble in organic liquids. In another embodiment 2-ethylhexyl (meth)acrylate, isodecyl (meth)acrylate, lauryl (meth)acrylate, methacrylic ester 13.0 (CAS #: 90551-76-1), methacrylic ester 17.4 (CAS #: 90551-84-1), and/or stearyl (meth)acrylate is used. Suitably lauryl methacrylate or 2-ethylhexyl (meth)acrylate is used.

The aromatic vinyl monomers of the disclosure contain a vinyl group bonded to an aromatic group. Examples include styrene, substituted styrene, vinyl naphthalene, and mixtures thereof. Preferred substituted styrenes include ortho-, meta- and/or para-alkyl, alkyloxy or halogen substituted styrenes, such as methyl styrene, 4-tert-butyl styrene, tert-butyloxy styrene, 2-chlorostyrene and 4-chlorostyrene. The preferred aromatic vinyl monomer is styrene. The use of styrene can increase the Tg of the polymer and reduce the cost. When the homopolymer that is formed from the aromatic vinyl monomer is not soluble in organic liquids, the amount of this monomer in the polymeric rheology modifier is preferably limited to less than about 60%, more preferably less than 50% and more preferably less than about 40% by weight.

Other ethylenically unsaturated monomers different from the monomers above can also be included in the polymeric rheology modifier. These include but are not limited to monomers such as (meth)acrylic acid, maleic acid, 2-acrylamido-2-methylpropane, dimethylaminoethyl methacrylate, dimethylaminoethyl acrylate, N-[3-(dimethylamino)

propyl] methacrylamide, N-[3-(dimethylamino) propyl] acrylamide, (3-acrylamidopropyl)-trimethyl-ammonium chloride, methacrylamido propyl trimethyl ammonium chloride, (meth)acrylamide, N-alkyl (meth)acrylamides, N-vinyl pyrrolidone, vinyl formamide, vinyl acetamide, and N-vinyl caprolactams. When one of these other monomers contain a hydroxyl, acid, basic nitrogen, or heterocylic functionality it is preferred that the polymer rheology modifier contain less than 10%, more preferably, less than 5% and most preferably less than 2% by weight of these monomers.

In another aspect, the polymeric rheology modifier of the disclosure is substantially free of the polymerized residues of polar monomers. Polar monomers are defined as monomers that contain hydroxyl, carboxylic acid, basic nitrogen, or heterocylic functionality.

Cross-linking monomers (or cross-linkers) contain two or more ethylenically unsaturated functionalities. These include, but are not limited to divinyl benzene, 1,6-hexanediol di(meth)acrylate, ethylene glycol di(meth)acrylate, propylene glycol di(meth)acrylate, trimethylol propane tri (meth)acrylate, trimethylol propane diallyl ether, trimethylol propane triallyl ether, pentaerythritol triallyl ether, pentaerythritol tetraallyl ether, and pentaerythritol tri(meth) acrylate. The amount of cross-linker optionally present in the polymeric rheology modifier is from about 20 ppm to about 2000 ppm, preferably about 200 ppm to about 1500 ppm, more preferably about 300 ppm to about 1000 ppm, more preferably about 350 ppm to about 650 ppm. In some preferred embodiments, the amount of cross linker in the polymeric rheology modifier is 200 ppm, or 220 ppm, or 240 ppm, or 260 ppm, or 280 ppm, or 300 ppm, or 320 ppm, or 340 ppm, or 360 ppm, or 380 ppm, 400 ppm, or 420 ppm, or 440 ppm, or 460 ppm, or 480 ppm, 500 ppm, or 520 ppm, or 540 ppm, or 560 ppm, or 580 ppm, 600 ppm, or 620 ppm, or 640 ppm, or 660 ppm, or 680 ppm, or 700 ppm, or 720 ppm, or 740 ppm, or 760 ppm, or 780 ppm, 800 ppm, or 820 ppm, or 840 ppm, or 860 ppm, or 880 ppm, 900 ppm, or 920 ppm, or 940 ppm, or 960 ppm, or 980 ppm, or 1000 ppm, or 1020 ppm, or 1040 ppm, or 1060 ppm, or 1080 ppm, or 1100 ppm, or 1120 ppm, or 1140 ppm, or 1160 ppm, or 1180 ppm, or 1200 ppm, or 1220 ppm, or 1240 ppm, or 1260 ppm, or 1280 ppm, or 1300 ppm, or 1320 ppm, or 1340 ppm, or 1360 ppm, or 1380 ppm, or 1400 ppm, or 1420 ppm, or 1440 ppm, or 1460 ppm, or 1480 ppm, or 1500 ppm, or 1520 ppm, or 1540 ppm, or 1560 ppm, or 1580 ppm, or 1600 ppm, or 1620 ppm, or 1640 ppm, or 1660 ppm, or 1680 ppm, or 1700 ppm, or 1720 ppm, or 1740 ppm, or 1760 ppm, or 1780 ppm, or 1800 ppm, or 1820 ppm, or 1840 ppm, or 1860 ppm, or 1880 ppm, or 1900 ppm, or 1920 ppm, or 1940 ppm, or 1960 ppm, or 1980 ppm, or 2000 ppm.

Preferably, the glass transition temperatures (Tg) of the polymeric rheology modifier is high enough that the polymer can be isolated and handled as a solid. Preferably the Tg of the polymeric rheology modifier is greater than about 45° C., more preferably greater than about 60° C. and more preferably greater than about 75° C. Tg can be measured using standard procedures such as differential scanning calorimetry. For the Tg values described herein, the Tg of the polymer was calculated by placing a vial containing the polymer powder to be measured into a hot water bath (e.g., 75° C.) for 10 minutes. If the powder remained free flowing after 10 minutes in the hot water bath, the Tg of the powder was determined to be at least the temperature of the water bath. The temperature of the water bath was increased incrementally until the polymer was no longer free flowing to determine the Tg where appropriate. In other instances, a Tg was determined to be "greater than" the last water bath temperature in cases were an upper end transition temperature was not determined. The polymeric rheology modifiers of the present disclosure typically have a Tg>75° C.

The weight averaged molecular weight (Mw) of the copolymer of the invention, when measured in accordance with the method described below in Example 30, is preferably at least 20,000,000 Dalton (D), suitably at least 50,000, 000 (D); 100,000,000 (D); 150,000,000; and/or at least 200,000,000 D.

The polymeric rheology modifier of the disclosure may be synthesized by conventional methods for vinyl addition polymerization known to those skilled in the art, such as, but not limited to, solution polymerization, precipitation polymerization, and dispersion polymerizations, including suspension polymerization and emulsion polymerization. The preferred process is emulsion polymerization.

In an embodiment the polymeric rheology modifier of the disclosure is formed by emulsion polymerization, one or more monomers are dispersed in an aqueous phase and polymerization is initiated using a water soluble initiator. The monomers are typically water insoluble or very poorly soluble in water, and a surfactant or soap is used to stabilize the monomer droplets in the aqueous phase. Polymerization occurs in the swollen micelles and latex particles. Other ingredients that might be present in an emulsion polymerization include chain transfer agents such as mercaptans (e.g. dodecyl mercaptan) to control molecular weight, small amounts of water soluble organic solvents such as but not limited to acetone, 2-butanone, methanol, ethanol, and isopropanol, to adjust the polarity of the aqueous phase, and electrolytes to control pH. Suitable initiators include alkali metal or ammonium salts of persulfate such as ammonium persulfate, water-soluble azo compounds such as 2,2'-azobis (2-aminopropane)dihydrochloride, and redox systems such as Fe(II) and cumene hydroperoxide, and tert-butyl hydroperoxide-Fe(II)-sodium ascorbate. Suitable surfactants include anionic surfactants such as fatty acid soaps (e.g. sodium or potassium stearate), sulfates and sulfonates (e.g. sodium alkylbenzene sulfonate, isopropylamine salt of alkylbenzene sulfonate, or calcium alkylbenzene sulfonate), sulfosuccinates (e.g. dioctyl sodium sulfosuccinate); non-ionic surfactants such as octylphenol ethoxylates and linear and branched alcohol ethoxylates; and alkylamine alkoxylates, cationic surfactants such as cetyl trimethyl ammonium chloride; and amphoteric surfactants. Anionic surfactants and combinations of anionic surfactants and non-ionic surfactants are most commonly used. Polymeric stabilizers such as poly(vinyl alcohol-co-vinyl acetate) can also be used as surfactants. The solid polymer product free of the aqueous medium can be obtained by a number of processes including destabilization/coagulation of the final emulsion followed by filtration, solvent precipitation of the polymer from latex, or spray drying of the latex.

If the powder particle size is too large (e.g., more than mesh size 60 or 250 microns), the powder particles require a long time to dissolve in organic liquids. In some cases, if the sample is left un-agitated, the swollen polymer particles could stick together, preventing further dissolution. Hence, the particle size of the powder is preferably smaller than 60 mesh size, more preferably smaller than 100 mesh size (or ~150 microns). The polymeric rheology modifiers of the present disclosure are preferably a free flowing powder obtained by a spray drying process or by any suitable drying processes known in the art. However, a liquid latex of polymeric rheology modifier can also be used if the application can tolerate the presence of some water.

As used herein, mesh size refers to standard United States (US) mesh size. The mesh size number indicates the number of openings located along 1 linear inch of mesh.

In one aspect, the polymeric rheology modifiers of the present disclosure comprise at least 5 weight percent of bicyclic (meth)acrylate ester, in another aspect at least 10 weight percent, in another aspect at least 20 weight percent, in another aspect at least 40 weight percent, in still another aspect at least 60 weight percent, and in still another aspect at least 70 weight percent. In one embodiment the preferred range of bicyclic (meth)acrylate ester present in the rheology modifier is 5 to 50 wt %. In another embodiment, the preferred range of bicyclic (meth)acrylate ester present in the rheology is 10 to 30 wt %. In another embodiment, the preferred range of bicyclic (meth)acrylate ester present in the rheology is 20 to 70 wt %, or 25 to 60 wt %, or 30 to 55 wt %. In some preferred embodiments, the amount of bicyclic (meth)acrylate ester in the polymeric rheology modifier is 5 wt %, or 10 wt %, or 15 wt % or 20 wt %, or 25 wt %, or 30 wt %, or 35 wt % or 40 wt %, or 45 wt %, or 50 wt %, or 55 wt % or 60 wt %, or 65 wt %, or 70 wt %.

In another aspect, the polymeric rheology modifiers of the present disclosure comprise at least 25 weight percent of alkyl (meth)acrylates, in another embodiment at least 35 weight percent, in another embodiment at least 50 weight percent, in another embodiment at least 65 weight percent, and in another embodiment at least 80 weight percent. In one embodiment the preferred range of alkyl (meth)acrylate present in the rheology modifier is 25 to 70 wt %. In another embodiment, the preferred range of alkyl (meth)acrylate present in the rheology is 30 to 80 wt %, or 40 to 75 wt %, or 45 to 70 wt %. In some preferred embodiments, the amount of alkyl (meth)acrylate in the polymeric rheology modifier is 25 wt %, or 30 wt %, or 35 wt % or 40 wt %, or 45 wt %, or 50 wt %, or 55 wt % or 60 wt %, or 65 wt %, or 70 wt %, or 75 wt % or 80 wt %.

In another aspect, the polymeric rheology modifiers of the present disclosure comprise at least 10 weight percent of lower alkyl (meth)acrylates, in another embodiment at least 15 weight percent, in another embodiment at least 20 weight percent, in another embodiment at least 25 weight percent. In one embodiment the preferred range of lower alkyl (meth)acrylate present in the rheology modifier is 10 to 25 wt %.

In another aspect, the polymeric rheology modifiers of the present disclosure comprise at least 30 weight percent of fatty alkyl (meth)acrylates, in another embodiment at least 35 weight percent, in another embodiment at least 40 weight percent. In an embodiment the preferred range of fatty alkyl (meth)acrylate present in the rheology modifier is 30 to 40 wt %.

In another aspect, the polymeric rheology modifiers of the present disclosure comprise less than about 40 weight percent of aromatic vinyl monomers, in another embodiment less than about 35 weight percent, less than about 30 weight percent, less than about 25 weight percent, in another embodiment less than about 20 weight percent, and in another embodiment less than about 15 weight percent. In another embodiment, the preferred range of aromatic vinyl monomer present in the rheology is 10 to 40 wt %, or 15 to 30 wt %.

In an aspect, the polymeric rheology modifier is obtainable by co-polymerizing at least two of the following monomers:
a bicyclic (meth)acrylate ester,
a linear or branched alkyl (meth)acrylate, and
an aromatic vinyl monomer.

In one embodiment the polymeric rheology modifier is polymerized from a mixture of monomers at least comprising a bicyclic (meth)acrylate ester.

In an aspect, the polymeric rheology modifier is polymerized from:
5 to 50 wt % of the bicyclic (meth)acrylate ester
25 to 75 wt % of the lower alkyl (meth)acrylate, and
10 to 40 wt % of the aromatic vinyl monomer.

In another aspect, the polymeric rheology modifier is polymerized from:
20 to 70 wt %, preferably 25 to 60 wt %, and more preferably 30 to 55 wt % bicyclic (meth)acrylate ester, and
30 to 80 wt %, preferably 40 to 75 wt %, and more preferably 45 to 70 wt % alkyl (meth)acrylate.

In another aspect, the polymeric rheology modifier is polymerized from:
10 to 30 wt % bicyclic (meth)acrylate ester,
10 to 25 wt % lower alkyl (meth)acrylate,
30 to 40 wt % fatty-alkyl (meth)acrylates, and
15 to 30 wt % aromatic vinyl monomer.

In another aspect, the polymeric rheology modifier is obtainable by copolymerizing a lower alkyl (meth)acrylate monomer with at least one additional monomer selected from:
a bridged bicyclic (meth)acrylate ester monomer,
an aromatic vinyl monomer, and
a fatty-alkyl (meth)acrylate monomer,
wherein each of said monomers can be substituted or unsubstituted.

In another aspect, the polymeric rheology modifier is obtainable by copolymerizing an alkyl (meth)acrylate and bicyclic (meth)acrylate ester, and optionally an aromatic vinyl monomer.

In another aspect, the polymeric rheology modifier is obtainable by co-polymerizing a monomer mixture comprising at least one alkyl (meth)acrylate with and at least one of:
a bicyclic (meth)acrylate ester different from the alkyl (meth)acrylate, and an aromatic vinyl monomer.

In one embodiment, the polymeric rheology modifier comprises isobornyl methacrylate and isobutyl methacrylate.

In one embodiment, the polymeric rheology modifier comprises styrene and isobutyl methacrylate.

In one embodiment, the polymeric rheology modifier comprises styrene, isobutyl methacrylate and lauryl methacrylate.

In one embodiment, the cross-linked polymeric rheology modifier comprises isobornyl methacrylate, styrene, and isobutyl methacrylate.

In one embodiment, the polymeric rheology modifier comprises isobornyl methacrylate, isobutyl methacrylate and lauryl methacrylate.

In one embodiment, the polymeric rheology modifier comprises isobornyl methacrylate, isobutyl methacrylate and ethylhexyl methacrylate.

In one embodiment, the polymeric rheology modifier comprises isobornyl methacrylate, styrene, isobutyl methacrylate and lauryl methacrylate.

Throughout this document, the weight percentages of the monomer that constitute the copolymer are based on the total weight of the monomers used, whereby the total weight of the monomers adds up to 100 wt %.

In the polymeric rheology modifier of the disclosure, the monomers may be arranged in any fashion, such as in blocks or randomly. Preferably, the copolymer is a randomly arranged copolymer.

Organic Liquids

The organic liquids of the disclosure are preferably in a liquid state at application temperature. The application temperature range is typically between 0° C. to 60° C.

The organic liquids of the disclosure include several different categories set forth below. The various categories can be included within or excluded from the scope of the organic liquid of the disclosure.

a. Esters Preferred organic liquids of the disclosure are esters.

The esters of the present invention include esters of monocarboxylic acids, dicarboxylic acids, and citric acid. The esters of monocarboxylic acids have the following general structure (a):

R'—COOR"  (a)

where R' and R" both independently are a 01-C18 linear or branched, substituted or unsubstituted aliphatic group, or an aromatic group. The preferred R' group is a methyl, C8-C18 alkyl, phenyl radical, a hydroxyl substituted phenyl radical, or a terminal hydroxyl substituted alkyl group. The preferred R" group is a methyl, propyl, isopropyl, butyl, 2-ethylhexyl, or a phenyl radical. The more preferred esters of monocarboxylic groups are methyl esters and isopropyl esters of soya acid, corn oil acid, canola oil acid, rapeseed oil acid, coconut oil acid, oleic acid, caprylic acid, 2-ethylhexyl acid, nonanoic acid, capric acid, lauric acid, myristic acid, palmitic acid, stearic acid; linear or branched alkyl (C6-C13) acetates such as Exxate 600, Exxate 700, Exxate 800, and Exxate 1300, phenyl acetate, C12-15 benzoate, and butyl 3-hydroxybutanoate.

The esters of dicarboxylic acids have the following general structure (b)

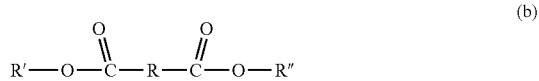

where R' and R" both independently are a 01-C18 linear or branched, substituted or unsubstituted aliphatic group, or an aromatic group; and R is aliphatic or aromatic. When R is aliphatic, the preferred R group is an alkylene group $(CH_2)_n$ where n is 2-7. When R is aromatic, the preferred R group is a phenyl radical. The preferred R' and R" groups are methyl, ethyl, propyl, isopropyl, butyl, or 2-ethylhexyl. The more preferred esters of dicarboxylic groups are lactate, glutarate, succinate, phthalates, adipates, and azelates.

Non-limiting examples of esters of citric acid are acetyl-tri-butyl citrate, acetyltri-hexyl citrate, acetyltri-2-ethylhexyl citrate, butyryltri-butyl citrate, butyryltri-hexyl citrate, and butyryltri-2-ethylhexyl citrate.

The most preferred organic liquids are fatty acid esters which refer to any ester of an oil derived from vegetables or animals, including but not limited to hydrogenated and non-hydrogenated, epoxidized and non-epoxidized, soy methyl esters, rapeseed methyl esters, canola methyl esters, safflower methyl esters, ricinoleic acid methyl esters, castor methyl esters, isopropyl myristate, isopropyl palmitate, and C8-C10 methyl esters. The fatty acid esters of the disclosure are preferably plant derived.

In an aspect, the fatty acid esters of the disclosure are a C1-C8 alkyl ester of fatty carboxylic acids with 8-24 carbon atoms.

b. Fatty Acids

Non-limiting examples of fatty acids of the present disclosure include C6-C10 acid, 2-ethylhexyl acid, oleic acid, linoleic acid, tall oil fatty acid, and tung oil.

c. Aromatic Compounds

The polymeric rheology modifiers of the disclosure are particularly effective at thickening aromatic compounds. Non-limiting examples of aromatic compounds are benzene, toluene, xylene, alkylnaphthalene, alkoxylated phenol, propofol, benzaldehyde, phenyl isocynate, Butyloctyl Salicylate (Hallbrite BHB), and aromatic solvents Preferred organic liquids of the disclosure are aromatic compounds, which in the present disclosure refer to a complex combination of hydrocarbons having a ring-like molecular structure and are generally obtained from petroleum aromatic streams through various processes such as distillation. Non-limiting examples of CAS numbers for these aromatic solvents are 64742-94-5, 64742-95-6, 195459-66-6, 195459-67-7, 68188-48-7, 64742-03-6, and 70693-06-0. Non-limiting examples of commercial products are aromatic solvents with flash point of 200° F. (Aromatic 200 Fluid, Aromatic 200ND Fluid and Solvesso 200 from Exxon Mobil Chemical, Caromax 28A and 28A LN from Halterman Carless), aromatic solvents with flash point of 150° F. (Aromatic 150 Fluid and Aromatic 150ND Fluid from Exxon Mobil, Caromax 20A and 20A LN from Halterman Carless), and aromatic solvents with flash point of 100° F. (Aromatic 100 Fluid from Exxon Mobile, Caromax 18A and Caromax 28A from Halterman Carless).

d. Glycerides

The preferred glycerides are triglycerides. Non-limiting examples of triglycerides are glycerol tri-2-ethylhexyl, caprylic capric triglyceride (Myritol 318). More preferred triglycerides are oils from various plants, including soy bean oil, rapeseed oil, canola oil, corn oil, and linseed oil.

e. Essential Oils

Non-limiting examples of essential oils are sandalwood oil, cedarwood oil, chamomile oil, vanilla oil, tea tree oil, eucalyptus oil, peppermint oil, bergamot oil, lavender oil, rosemary oil, rose oil, cinnamon oil, frankincense oil, lemongrass oil, geranium oil, orange oil, vetiver oil, lemon oil, jasmine oil, cedar oil, and grapefruit oil.

f. Turpentines

Non-limiting examples of turpentines are pine oil and mineral spirits.

g. Ethers

The ethers of the present disclosure have the following general chemical formula:

R'—O—R"  (c)

where R' is a C1-C18 linear or branched, substituted or unsubstituted aliphatic group, and R" is a C3-C12 linear or branched, substituted or unsubstituted aliphatic group. Preferred ethers are methyl propyl ether, di-propyl ether, butyl propyl ether, pentyl propyl ether, diethyl ether. Ethers can also be acyclic ether such as tetrahydrofuran.

h. Alcohol and Alcohol Alkoxylates

Non-limiting examples of alcohols include isostearyl alcohol, n-Butanol, hexanol, 2-ethylhexyl alcohol, Exxal 9 (Branched C9 alcohol) and decanol.

Non-limiting examples of alcohol alkoxylates include butyl alcohol with 1 ethylene oxide unit (C4, EO1), and 2-ethylhexyl alcohol with 1-4 ethylene oxide unit.

i. Cyclic Terpenes

Non-limiting examples of cyclic terpenes include d-limonene.

j. Chlorine Substituted Hydrocarbons

Non-limiting examples of chlorine substituted hydrocarbons include methylene chloride, chloroform, and carbon tetrachloride.

k. Pesticides

Non-limiting examples of pesticides include herbicides, fungicides, insecticides, growth regulators. Preferred herbicides include phenoxy herbicides such as 2,4-D ester herbicide, esters of dicamba acid, and esters of MCPA, chloroacetanilides herbicides such as acetochlor and alarchlor. A preferred insecticide is methoprene. Preferably the pesticides of the disclosure are liquid pesticides.

l. Amines m. Non-Limiting Examples of Amines Include Butyl Amine and Cocoamine.

n. Heterocyclic Compounds

Non-limiting examples of heterocyclic compounds include morpholine, tetrahydrofuran, 1-dodecyl-2-pyrrolidone, and N-methyl-2-pyrrolidone.

o. Silicone Oils with Aromatic Groups

Non-limiting examples of silicone oils include silicone oils with aromatic groups such as phenyl trimethicone (Dow Corning 556 oil) and polyphenylmethyldimethylsiloxane (Dow Corning 550 oil).

p. Ketones

Ketones of the present disclosure have the following formula:

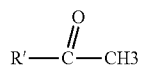

(d)

where R' is a C2-C10 linear or branched alkyl group. Non-limiting examples of ketones include methyl ethyl ketone.

q. Alkyl Dimethyl Amides

Non-limiting examples of alkyl dimethyl amides have the following general chemical formula;

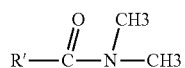

(e)

where R' is a C3-C10 linear or branched alkyl group. Non-limiting examples of alkyl dimethyl amides include C8 dimethylamide, 010 dimethylamide, mixtures of C8 and 010 dimethylamide, and isopropyl dimethylamide (or N,N,2-Trimethylpropanamide).

r. Alkylnitriles

Alkylnitriles have the following general chemical formula:

(f)

Where R' is C8-C18 are linear or branched alkyl group. Non-limiting examples of alkylnitrile include coco nitrile, tallow nitrile, and soy nitrile.

s. Alkylene Glycols

Non-limiting examples of alkylene glycols include diethylene glycol C1-C8 alkyl acetate such as butyl ether acetate diethylene glycol butyl ether acetate.

t. Trialkyl Phosphates

Trialkyl phosphates of the present disclosure have the following general molecular formula:

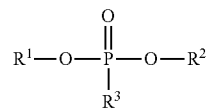

(g)

where $R^1$, $R^2$, and $R^3$ are independently C1-C10 linear or branched alkyl group or a toluene radical. Non-limiting examples of trialkyl phosphate include trimethyl phosphate, triethyl phosphate, tri(iso)propyl phosphate, tributyl phosphate, and tricresyl phosphate.

In one aspect the organic fluids of the disclosure are substantially free of petroleum based fuels, such as fuels conventionally known as gasoline and diesel fuels. In a proviso, the polymeric rheology modifier is not used in gasoline, wherein gasoline refers to a liquid hydrocarbon based fuel suitable for running a spark ignition engine, as is commonly known in the art, and includes such fuels from petroleum raw material, renewable raw material, and mixtures thereof.

In another proviso, the polymeric rheology modifier is not used in diesel fuels, wherein diesel refers to a liquid hydrocarbon based fuel suitable for running a compression ignition engine, as is commonly known in the art, and includes such fuels from petroleum raw material, renewable raw material, and mixtures thereof, including B7 diesel fuel.

In an aspect, the polymeric rheology modifier of the disclosure comprises fatty acids, fatty acid esters, aromatic solvents, glycerides, essential oils, turpentines, ethers, alcohols, alcohol alkoxylates, cyclic terpenes, chlorine substituted hydrocarbons, pesticides, amines, heterocyclic compounds, silicone oils with aromatic groups, ketones, alkyl dimethyl amides, alkylnitriles, alkylene glycols, and trialkyl phosphates, and is substantially free of petroleum based fuels, including gasoline and diesel fuels.

In an aspect, the polymeric rheology modifier of the disclosure comprises fatty acids and fatty acid esters, and is substantially free of petroleum based fuels, including gasoline and diesel fuels.

In an aspect, the polymeric rheology modifier of the disclosure comprises aromatic solvents, and is substantially free of petroleum based fuels, including gasoline and diesel fuels.

In an aspect, the polymeric rheology modifier of the disclosure consists of fatty acids and fatty acid esters.

In an aspect, the polymeric rheology modifier of the disclosure consists of aromatic solvents.

In one aspect the organic fluids of the disclosure are substantially free of organic sunscreen active agents, such as are octyl salicylate, ethylhexyl methoxycinnamate, homosalate, octocrylene, and menthyl anthranilate (meradimate). In a proviso, the polymeric rheology modifier is not used in sunscreen active agents, wherein "sunscreen active agents" or "sunscreen active" shall include all of those materials, singly or in combination, that are regarded as acceptable for use as active sunscreen ingredients based on their ability to absorb UV radiation.

Rheology Modification

The polymeric rheology modifiers of the disclosure have the ability to thicken organic liquids, without the need for pre-hydration (or activation) and without the need for heating in most cases.

In one aspect, the thickened organic liquid composition comprises one or more organic liquid and one or more of the polymeric rheology modifiers of the present disclosure. The thickened organic liquid composition comprises, based on total formulation weight, 40-99.5 wt % organic liquid, preferably 60-80 wt % organic liquid. In some preferred embodiments, the amount of organic liquid in the thickened organic liquid composition is 40 wt %, or 45 wt %, or 50 wt % or 55 wt %, or 60 wt %, or 65 wt %, or 70 wt % or 75 wt %, or 80 wt %, or 85 wt %, or 90 wt % or 95 wt %, or 99.5 wt %.

In one aspect, the thickened organic liquid composition comprises, based on total formulation weight, 0.5-15% polymeric rheology modifiers of the present disclosure, preferably 1-10%, more preferably 2-8% polymeric rheology modifiers of the present disclosure. In some preferred embodiments, the amount of polymeric rheology modifiers in the thickened organic liquid composition is 0.5 wt %, or 1 wt %, or 2 wt % or 3 wt %, or 4 wt %, or 5 wt %, or 6 wt % or 7 wt %, or 8 wt %, or 9 wt %, or 10 wt % or 11 wt %, or 12 wt %, or 13 wt %, or 14 wt % or 15 wt %.

The thickened organic liquid compositions of the disclosure can contain solid particles in the thickened organic liquid composition at a concentration of between 2 to 50 wt %, preferably 3-40 wt %, and more preferably 4-35 wt %. Non-limiting examples of such solid particles include cutting debrides, sands, and proppants used in oil field drilling.

The thickened organic liquid compositions of the disclosure can contain agrochemicals present in the thickened organic liquid composition at a concentration of between 2 to 50 wt %, preferably 3-40 wt %, and more preferably 4-35 wt %.

Other Ingredients

The agrochemicals of the present disclosure refer to any solid chemicals used in agricultural formulations. They include pesticides, growth inhibitors, fertilizers, micronutrients, and adjuvants (including spray drift reduction adjuvants). The agrochemicals used in the formulations of the present disclosure generally remain in solid form below about 60° C. Although any powder agrochemicals with various sizes can be used in a thickened organic liquid composition, the solid agrochemicals preferably have a particle size less than 200 microns, less than 100 microns, less than 20 microns, preferably less than 10 microns, and more preferably less than 5 microns.

Suitable solid pesticides include insecticides, fungicides, herbicides, algaecides, moluscides, miticides, and rodenticides. In an aspect, suitable pesticides include captan, glyphosate acid, 2,4-D acid, diuron, atrazine, tebuconazole, azoxystrobin, nicosulfuron, copper oxychloride, imidacloprid and mancozeb.

Other agrochemicals suitable in the present disclosure include solid drift control agents such as polysaccharides including guar gum and its derivatives, xanthan gum, and cellulosic derivatives such as MEHEC, MHEC, EHEC and HEC. In an aspect, the solid drift control agent is present in the thickened organic liquid composition at a concentration of between 2 to 10 wt %, preferably 3 to 7 wt %. In some preferred embodiments, the amount of drift control agent in the thickened organic liquid composition is 2 wt %, or 3 wt %, or 4 wt % or 5 wt %, or 6 wt %, or 7 wt %, or 8 wt % or 9 wt %, or 10 wt %.

In one aspect, the solubility of the solid agrochemicals of the present disclosure in the selected organic liquids is below 10%, preferably below 5%, more preferably below 2%, and still more preferably below 1% by weight. For determining solubility in organic liquids, solid agrochemical was added in 1% increments to the organic liquids until turbidity could be detected with the naked eye. The turbidity indicates the solid has reached its solubility limit in the organic liquids and that additional addition of solid will not be dissolved.

Pesticide formulations of the disclosure can contain emulsifiers to facilitate dilution in water by the end-user immediately prior to spray application and to facilitate cleaning of spray vessels. Preferably the emulsifiers are built-in with the formulations rather than mixed in just before the spraying. The choice of emulsifier system depends on the nature and the source of the oil or oil ester.

For the thickened organic liquid compositions of the disclosures, suitable emulsifiers include one or more nonionic surfactants, anionic surfactants, nonionic block copolymers, phosphate esters, or nitrogen containing alkoxylates.

The amount of emulsifier when used in the thickened organic liquid compositions of the disclosure is typically between 2-30 wt %, preferably between 4-20 wt %, preferably between 4-15 wt %, more preferably between 5-10 wt % based upon total thickened organic liquid composition weight. Non-limiting examples of emulsifiers are: (1) nonionic surfactants: alcohol alkoxylates such as Ethylan 994, 995, and NS-500LQ; castor oil ethoxylates such as Emulpon CO-50, CO-100, CO-200, and CO-360; sorbitol ester ethoxylates such as Armotan AL 69-66; sorbitan monolaurate and its ethoxylates such as Span 80 and Tween 20 (Polyoxyethylene-20 sorbitan monolaurate), fatty acid mono-diglyceride ethoxylates such as REWODERM LI 520, LI 63, LI 67, LI 48, LI 420, and ES 90, ethoxylated vegetable oils, and ethoxylated fatty acids; (2) anionic surfactants:

calcium and amine salts of alkyl benzene sulfonates, and phosphate ester ethoxylates such as Phospholan PH-115, 118, PS-121, PS-131, PS-220, PS-222, PS-236, PS-400, PS-810, PS-900, and their salts; (3) Block co-polymers such as EO-PO, EO-PO, PO-EO-PO block copolymer; and (4) nitrogen containing surfactants: alkylamine alkoxylates such as Ethomeen T/25, S/12, S/15, and C/12, amides and ethoyxlated amides such as Witcomide 511, 128T, Ethomid O/17 and HT/23.

In an embodiment, the emulsifier added to the thickened organic liquid compositions of the disclosure comprises 5 wt % to 60 wt % nonionic surfactant, 30 wt % to 70 wt % anionic surfactant, and 0 to 50 wt % of block copolymers, based upon total emulsifier weight. In a preferred embodiment, the anionic surfactant is calcium dodecylbenzene sulfonate (60% active).

Preferably the thickened organic liquid compositions of the disclosure contain less than 20 wt % ethoxylated alkyl phosphate ester emulsifier, if present at all.

In an aspect of the thickened organic liquid composition of the disclosure, an organic liquid comprises from 50 wt % to 95 wt % of the total composition weight; the solid particles comprise from 4 to 50 wt %, preferable from 5 to 40 wt %, of the total composition weight; the polymeric rheology modifier comprises from 0.5 to 10 wt %, preferable from 2 to 5 wt %, of the total composition weight, and an emulsifier comprises from 4 to 20 wt %, preferable from 5 to 10 wt % of the total composition weight. More specifically, the organic liquid comprises 50 wt %, or 55 wt %, or 60 wt %, or 65 wt %, or 70 wt %, or 75 wt %, or 80 wt %, or 55 wt %, or 90 wt %, or 95 wt % of the total composition weight. The solid particles (such as solid agrochemicals) comprise 4 wt %, or 10 wt %, or 15 wt %, or 20 wt %, or 25 wt %, or 30 wt %, or 35 wt %, or 40 wt %, or 45 wt %, or 50 wt % of the total composition weight. The polymeric rheology modifier comprises 0.5 wt %, or 1 wt %, or 2 wt %, or 3 wt %, or 4 wt %, or 5 wt %, or 6 wt %, or 7 wt %, or 8 wt %, or 9 wt %, Or 10 wt % of the total composition weight. The emulsifier comprises 4 wt %, or 5 wt %, or 6 wt %, or 7 wt %, or 8 wt %, or 9 wt %, or 10 wt %, or 11 wt %, or 12 wt %, or 13 wt %, or 14 wt %, or 15 wt %, or 16 wt %, or 17 wt %, or 18 wt %, or 19 wt %, or 20 wt % of the total composition weight.

The presence of an emulsifiers is not critical for the purpose of the present disclosure.

The robust thickening performance of the polymeric rheology modifiers of the present disclosure, both in the presence and in the absence of emulsifiers are shown in some of the aspects of the disclosure. The thickening property of the polymeric rheology modifiers of the present disclosure is generally independent of any emulsifiers that may be included in the formulation (unless excessive amounts of emulsifier are used).

The thickened organic liquid compositions with or without the suspended solid particles of the disclosure can be gel-like (very high viscosity) but preferably the viscosity of the formulations is less than 5000 mPas (according to a Brookfield viscometer at 10 rpm at 22° C.), preferably less than 3000 mPas.

In an aspect, the viscosity of the thickened organic liquid compositions of the disclosure is at least 150 mPas, preferably at least 300 mPas, more preferably at least 600 mPas, and still more preferably at least 1000 mPas measured by a Brookfield viscometer at 10 rpm at 22° C.

In one aspect, the thickened organic liquid compositions of the disclosure display shear thinning property and the formulation viscosity does not increase by more than 50%, preferably not more than 30%, more preferably not more than 20%, and still more preferably not more than 10%, after storage tests.

In an aspect, the thickened organic liquid compositions of the present disclosure preferably contain no water. To the extent water is present, the amount of water should be less than 10%, preferably less than 5%, and more preferably less than 1% by weight.

Other additives may be included in the thickened organic liquid compositions of the disclosure. Such additional additives include, without limitation, defoamers, anti-microbials, colorants, fragrances, dispersants, biocides, and clays. If present in the thickened organic liquid compositions of the disclosure, these additional additives are preferably present at an amount less than 5% by weight.

In one aspect, the thickened organic liquid composition is an OD formulation comprising one or more fatty acid esters, one or more powders, and one or more of the polymeric rheology modifiers of the present disclosure. The OD formulation comprises, based on total formulation weight, 40-95 wt % vegetable fatty acid ester, preferably 60-80 wt % fatty acid ester; 2-60 wt % powders, preferably 5-45%, more preferably 10-40 wt % powders; and 0.5-15 wt % polymeric rheology modifiers of the present disclosure, preferably 1-10 wt %, more preferably 2-5 wt % polymeric rheology modifiers of the present disclosure.

In another aspect, the thickened organic liquid composition is an OD formulation comprising one or more fatty acid esters, one or more powder agrochemicals, one or more of the polymeric rheology modifiers of the present disclosure, and one or more emulsifiers. The OD formulation comprises, based on total formulation weight, 50-95 wt % vegetable fatty acid ester, preferably 60-80 wt % fatty acid ester; 4-50 wt % powder agrochemicals, preferably 10-45 wt %, more preferably 20-40 wt % powder agrochemicals; 0.5-10 wt % polymeric rheology modifiers of the present disclosure, preferably 1-5 wt %, more preferably 2-3 wt % polymeric rheology modifiers of the present disclosure, and 2-30 wt % emulsifiers, preferably 5-15 wt %, more preferably 7-12 wt % emulsifiers.

In another aspect, the thickened organic liquid composition is an OD formulation comprising one or more fatty acid esters, one or more powder agrochemicals including one or more powder drift control agent, one or more of the polymeric rheology modifiers of the present disclosure, and one or more emulsifiers. The OD formulation comprises, based on total formulation weight, 1-15% polymeric rheology modifiers of the present disclosure, 5-30% emulsifiers, 5-30% drift control agents, 4-50% solid agrochemicals, and 50-95 wt % vegetable fatty acid ester.

In another aspect, the thickened organic liquid composition is an OD formulation comprising one or more aromatic compounds, one or more powders, and one or more of the polymeric rheology modifiers of the present disclosure. The OD formulation comprises, based on total formulation weight, 40-95 wt % aromatic compounds, preferably 60-80 wt % aromatic compound; 2-60 wt % powders, preferably 5-45%, more preferably 10-40 wt % powders; and 0.5-15 wt % polymeric rheology modifiers of the present disclosure, preferably 1-10 wt %, more preferably 2-5 wt % polymeric rheology modifiers of the present disclosure.

In another aspect, the thickened organic liquid composition is an OD formulation comprising one or more aromatic compounds, one or more powder agrochemicals, one or more of the polymeric rheology modifiers of the present disclosure, and one or more emulsifiers. The formulation comprises, based on total formulation weight, 50-95 wt % aromatic compound, preferably 60-80 wt % aromatic compound; 4-50 wt % powder agrochemicals, preferably 10-45 wt %, more preferably 20-40 wt % powder agrochemicals; 0.5-10 wt % polymeric rheology modifiers of the present disclosure, preferably 1-5 wt %, more preferably 2-3 wt % polymeric rheology modifiers of the present disclosure, and 2-30 wt % emulsifiers, preferably 5-15 wt %, more preferably 7-12 wt % emulsifiers.

In another aspect, the thickened organic liquid composition is an OD formulation comprising one or more aromatic compound, one or more powder agrochemicals including one or more powder drift control agent, one or more of the polymeric rheology modifiers of the present disclosure, and one or more emulsifiers. The OD formulation comprises, based on total formulation weight, 1-15% polymeric rheology modifiers of the present disclosure, 5-30% emulsifiers, 5-30% drift control agents, 4-50% solid agrochemicals, and 50-95 wt % aromatic compound.

The polymeric rheology modifier of the disclosure exhibit several advantages over other more conventional thickeners such as clays (e.g. Attagel 50 available from BASF) and other polymers (e.g. Atlox Rheostrux 200 from Croda disclosed in WO2015/145105 and WO2009/151568), Oleo-Craft LP-20 from Croda, Intelimer 13-6 from Evonik, and dextrin palmitate). These advantages include: (1) generally no requirement of heating to activate thickening, whereas conventional polymeric thickeners require heating to, for example, >80° C. to activate the thickening property; (2) reduced sensitivity to the presence of anionic surfactants, whereas conventional polymeric thickeners can lose their thickening performance in the presence of anionic surfactants; (3) the ability to thicken a large variety and a wide range of organic liquids compared to other conventional thickeners; and (4) the thickening property of the polymeric rheology modifiers of the disclosure remains effective at elevated temperatures such as, for example, 50 to 55° C.

Good stability at temperature>50° C. is critical for agrochemical formulations and other products that are typically stored in warehouses without temperature control during summer months.

EXAMPLES

A description of the components used in the examples are as follows:

Soy methyl ester—three brands were used: Methyl Soyate from Cargill, SoyGold 1000 from Chempoint, and soy methyl ester from Envi Saver. Each could be used interchangeably without impacting the formulation properties.

Witconate® P-1220EH—Anionic emulsifier of alkyl benzene sulfonate (~60%) in 2-ethylhexyl alcohol and propylene glycol available from AkzoNobel.

Witconate® P-1460EH—Anionic emulsifier of alkyl benzene sulfonate (~60%, dimethylamidopropyl amine salt) in 2-ethylhexyl alcohol available from AkzoNobel.

Armotan® AL 69-66—Nonionic emulsifier of polyoxyethylene sorbitol tallate available from AkzoNobel.

Ethylan® NS-500LQ—Polyoxyalkylene glycol butyl ether from AkzoNobel Aerosol® OT-75 PG—Sodium dioctyl sulfosuccinate, 75% in propylene glycol and water; available from Cytec Emulpon® CO-200 and CO-360—Castor oil ethoxylates from Akzonobel Walocel® 60K—Hydroxyethyl methyl cellulose from Dow AGRHO® DR-2000—Hydroxyl propyl guar gum from Solvay Atlox Rheostrux 200 from Croda Attagel 50—magnesium aluminum silicate from BASF Intelimer 13-6—Poly C10-30 alkyl acrylate from Evonik OleoCraft LP-20—Polyamide-8 from Croda OleoCraft HP-31—Polyamide-3 from Croda Isostearyl alcohol (Prisorine 3515)

Branched C9 alcohol (Exxal 9)

Stearyl alcohol 15-polypropoxylate (Arlamol E)

Butanol-1 EO (2-butoxyethanol, Butyl Cellosolve)

Solvent Naphtha, Heavy Aromatic (Aromatic-200 and 150) Solvent Naphtha, Light

Aromatic-100 (C9-10 dialkyl and trialkylbenzenes)

C12/15 benzoate (Finsolv TN)

Octocrylene (Neo Heliopan 303)

Homosalate (Neo Heliopan HMS)

Octyl salicylate (Neo Heliopan OS)

Menthyl anthranilate (Neo Heliopan MA)

Ethylhexyl methoxycinnamate (Neo Heliopan AV)

Glycerol triisostearate (Prisorine 2041)

Gycerol tri-2-ethylhexanoate (Estol 3609)

Caprylic capryl triglyceride (Myritol 318)

Dimethicone/Vinyl Dimethicone Crosspolymer (and) Silica (Dow Corning 550 Fluid)

Phenyl trimethicone (Dow Corning 556 Fluid)

Stearyl alcohol 15-polypropoxylate (Arlamol E)

Butyloctyl Salicylate (Hallbrite BHB)

Phenol ethoxylate (Agrisol PX-413)

Butyl 3-hydroxylbutanoate (Eastman Omnia Solvent)

A series of exemplary copolymers and polymers (i.e. the polymeric rheology modifiers of the disclosure) were made using different combinations of monomers. Isobornyl methacrylate, isobutyl methacrylate, 2-EHMA and isodecyl methacrylate was obtained from Sigma-Aldrich. Lauryl methacrylate was methacrylic ester 13.0 obtained from Evonik (VISIOMER® terra C13-MA). All monomers are available from Evonik as well, including isobutyl methacrylate (VISIOMER® i-BMA), isobornyl methacrylate (VISIOMER® Terra IBOMA) 2-EHMA (VISIOMER® EHMA), and isodecyl methacrylate (VISIOMER® IDMA).

Example 1. Synthesis of Cross-Linked Isobornyl Methacrylate-Isobutyl Methacrylate Polymeric Rheology Modifier Exemplary polymeric rheology modifier (Synthesis Example 1) was prepared according to the following basic procedure.

TABLE 1

| Materials for Synthesis of Example 1 Polymeric Rheology Modifier | | |
|---|---|---|
| Initial Charge: | WT | wt % |
| Deionized water | 670.15 g | 56.72 |
| Aerosol ® OT-75 PG | 12.1 g | 1.02 |
| Co-solvent: | | |
| Acetone | 168.79 g | 14.28 |
| Monomer mix: | | |
| Isobornyl methacrylate | 162.59 g | 13.76 |
| Isobutyl methacrylate | 162.50 g | 13.75 |
| 1,6-hexanediol diacrylate | 0.1625 g | 0.01 |
| Oxidant solution: | | |
| t-Butyl hydroperoxide, 0.0348 g/mL solution in deionized water | 0.85 mL; 0.02958 g, active basis | 0.07 |
| Reductant solution: | | |
| Deionized water | 3.70 g | 0.31 |
| Sodium ascorbate | 0.0801 g | 0.01 |
| Iron (II) sulfate heptahydrate, 0.25% in deionized water | 0.67 g | 0.06 |
| Total | 1181.59 g | 100 |

Polymerization Procedure

A 2 L, 4-neck round bottom flask was equipped with an overhead mechanical stirrer; a Y-tube equipped with a nitrogen purge outlet-topped condenser and a thermometer; and two septa. To the flask were charged deionized water and Aerosol OT-75 PG. Using a thermostat controlled water bath, the reaction temperature was brought to about 48° C. A 12 minute sub-surface nitrogen purge was then initiated via a needle inserted through one of the septa while maintaining a 200 rpm agitation rate.

While maintaining the nitrogen purge, the monomer mixture and acetone were charged to the reaction vessel. The sub-surface nitrogen purge was continued after the monomer/acetone addition.

In a separate container, a reductant solution consisting of sodium ascorbate and iron (II) sulfate heptahydrate dissolved in deionized water was prepared. The iron (II) sulfate heptahydrate was added after the ascorbate had dissolved and just before use of the reductant solution.

The reaction was purged for an additional 12 minutes after the monomer/acetone addition, and then the resulting dark blue ascorbate solution was added via syringe to the reaction vessel in one shot while maintaining the sub-surface nitrogen purge.

About 10 minutes after the addition of the reductant, 0.85 mL of a t-butyl hydroperoxide solution in water (0.0348 g/mL) was added to the reaction via syringe in one shot while maintaining the sub-surface nitrogen purge.

Within about 7 minutes, the onset of an exotherm was noted, and the sub-surface nitrogen purging was stopped in favor of above-surface nitrogen purging. As the reaction progressed, a bluish tint was noted in the emulsion, and it became increasingly more translucent, and a slight increase in viscosity was noted. The reaction temperature reached a maximum of about 56° C. (initial temp: 48° C.) before it began to subside after about 40 min. The reaction temperature was maintained thereafter at 48-50° C. using the water bath. After a total of 5 h reaction time, the reaction was cooled and poured through cheesecloth into a container.

The product was a milky liquid with a solid content of ~29% (measured gravimetrically).

Solid polymer was isolated by adding the undiluted emulsion polymer to an excess of 0.5 N ammonium acetate in deionized water. The resulting precipitate was collected by vacuum filtration and washed extensively with water, and the solid was dried to a constant weight in a forced air oven at 60° C. Alternatively, solid polymer can be obtained by pan-drying or spray drying the liquid product at elevated temperatures with various techniques known to those skilled in the art. The solid obtained after drying can be further ground into a fine powder with various techniques known to those skilled in the art. The powder was passed through a 100 mesh screen in this example.

Example 2. Synthesis of Additional Polymeric Rheology Modifiers

Additional polymeric rheology modifiers were prepared following the basic procedure used to prepare Synthesis Example 1. The compositions of these polymers and those of Synthesis Example 1 are summarized in the Table 2 below.

TABLE 2

Exemplary Polymeric Rheology Modifiers

| Thickener # | Lot # | IBXMA | Styrene | IBMA | LMA | 2-EH MA | Iso C10 MA | X-Lnk'r | | t-BHP, 100% basis (pphm) |
|---|---|---|---|---|---|---|---|---|---|---|
| | | Monomer Ratio (wt %)* | | | | | | | mg/kg | |
| 1 | 2900-37B | 50 | | 50 | | | | A | 500 | 0.0091 |
| 2.1 | 2607-071 | | 40 | 50 | 10 | | | A | 100 | 0.0091 |
| 2.2 | 2607-070 | | 40 | 50 | 10 | | | A | 213 | 0.0091 |
| 2.3 | 2607-068 | | 40 | 50 | 10 | | | A | 410 | 0.0091 |
| 2.4 | 2607-066 | | 40 | 50 | 10 | | | A | 850 | 0.0091 |
| 2.5 | 2607-063 | | 40 | 50 | 10 | | | A | 1500 | 0.0091 |
| 2.6 | 2900-37A | 25 | 22 | 18 | | 35 | | A | 200 | 0.0091 |
| 2.7 | 2728-004 | 25 | | 75 | | | | A | 500 | 0.0091 |
| 2.8 | 2907-21A | 35 | | 65 | | | | A | 500 | 0.0091 |
| 2.9 | 2907-34A | 35 | | 65 | | | | A | 500 | 0.0091 |
| 2.10 | 2907-21B | 35 | | 65 | | | | A | 500 | 0.0073 |
| 2.11 | 2907-22A | 35 | | 65 | | | | A | 650 | 0.0073 |
| 2.12 | 2907-22B | 35 | | 65 | | | | A | 350 | 0.0073 |
| 2.13 | 2907-23A | 35 | | 65 | | | | A | 650 | 0.0123 |
| 2.14 | 2907-23B | 35 | | 65 | | | | A | 350 | 0.0123 |
| 2.15 | 2907-24A | 35 | | 65 | | | | B | 1050 | 0.0073 |
| 2.16 | 2728-037 | 35 | | 65 | | | | A | 500 | 0.0091 |
| 2.17 | 2728-039 | 35 | | 65 | | | | B | 750 | 0.0098 |
| 2.18 | 2728-40 | 35 | | 65 | | | | B | 760 | 0.0098 |
| 2.19 | 2907-24B | 35 | | 65 | | | | B | 465 | 0.0098 |
| 2.20 | 2907-25A | 35 | | 65 | | | | B | 1050 | 0.0123 |
| 2.21 | 2907-25B | 35 | | 65 | | | | B | 465 | 0.0123 |
| 2.22 | 2907-44A | 35 | | 65 | | | | A | 1500 | .0091 |
| 2.23 | 2907-44B | 35 | | 65 | | | | A | 2000 | .0091 |
| 2.24 | 2907-38B | 35 | | 65 | | | | A | 3000 | .0091 |
| 2.25 | 2607-073 | 50 | | 50 | | | | A | 200 | .0091 |

TABLE 2-continued

Exemplary Polymeric Rheology Modifiers

| Thickener # | Lot # | IBXMA | Styrene | IBMA | LMA | 2-EH MA | Iso C10 MA | X-Lnk'r | | t-BHP, 100% basis |
|---|---|---|---|---|---|---|---|---|---|---|
| | | Monomer Ratio (wt %)* | | | | | | | mg/kg | (pphm) |
| 2.26 | 2728-007 | 50 | | 50 | | | | A | 350 | .0091 |
| 2.27 | 2728-009 | 50 | | 50 | | | | A | 500 | .0091 |
| 2.28 | 2728-013 | 50 | | 50 | | | | A | 500 | .0065 |
| 2.29 | 2907-29A | 35 | | 65 | | | | A | 500 | .0073 |
| 2.30 | 2907-29B | 35 | | 65 | | | | A | 500 | .0073 |
| 2.31 | 2900-35A | 50 | | 50 | | | | A | 1000 | .0091 |
| 2.32 | 2900-35B | 50 | | 50 | | | | A | 2000 | .0091 |
| 2.33 | 2907-19A | 50 | | 50 | | | | B | 220 | .0091 |
| 2.34 | 2907-19B | 50 | | 50 | | | | B | 435 | .0091 |
| 2.35 | 2907-20A | 50 | | 50 | | | | C | 220 | .0091 |
| 2.36 | 2907-20B | 50 | | 50 | | | | C | 435 | .0091 |
| 2.37 | 2728-006 | 75 | | 25 | | | | A | 500 | .0091 |
| 2.38 | 2728-028 | | 10 | 90 | | | | A | 250 | .0091 |
| 2.39 | 2728-029 | | 10 | 90 | | | | A | 500 | .0091 |
| 2.40 | 2728-030 | | 10 | 90 | | | | A | 750 | .0091 |
| 2.41 | 2907-15A | 5 | 13 | 82 | | | | A | 250 | .0091 |
| 2.42 | 2907-18A | 5 | 13 | 82 | | | | A | 400 | .0091 |
| 2.43 | 2907-15B | 5 | 13 | 82 | | | | A | 500 | .0091 |
| 2.44 | 2907-18B | 5 | 13 | 82 | | | | A | 600 | .0091 |
| 2.45 | 2907-17B | 5 | 13 | 82 | | | | A | 750 | .0091 |
| 2.46 | 2907-14A | 9.5 | 24.5 | 66 | | | | A | 250 | .0091 |
| 2.47 | 2907-14B | 9.5 | 24.5 | 66 | | | | A | 500 | .0091 |
| 2.48 | 2907-34B | 9.5 | 24.5 | 66 | | | | A | 500 | .0091 |
| 2.49 | 2907-27A | 9.5 | 24.5 | 66 | | | | A | 650 | 0.0123 |
| 2.50 | 2907-27B | 9.5 | 24.5 | 66 | | | | A | 350 | 0.0123 |
| 2.51 | 2907-31A | 9.5 | 24.5 | 66 | | | | A | 1000 | 0.0123 |
| 2.52 | 2907-31B | 9.5 | 24.5 | 66 | | | | A | 350 | 0.0123 |
| 2.53 | 2907-32A | 9.5 | 24.5 | 66 | | | | A | 650 | 0.0155 |
| 2.54 | 2907-32B | 9.5 | 24.5 | 66 | | | | A | 650 | 0.0155 |
| 2.55 | 2907-33A | 9.5 | 24.5 | 66 | | | | A | 1000 | 0.0187 |
| 2.56 | 2907-33B | 9.5 | 24.5 | 66 | | | | A | 350 | 0.0187 |
| 2.57 | 2907-39B | 50 | | 25 | 25 | | | A | 500 | 0.0091 |
| 2.58 | 2907-40B | 30 | | 50 | | 20 | | A | 500 | 0.0091 |
| 2.59 | 2907-38B | 35 | | 65 | | | | A | 3000 | 0.013 |
| 2.60 | 2728-064 | 65 | | | | | 35 | A | 500 | .0091 |
| 2.61 | 2728-065 | 65 | | | | 35 | | A | 500 | 0.0091 |

TABLE 2-continued

Exemplary Polymeric Rheology Modifiers

| Thickener # | Lot # | IBXMA | Styrene | IBMA | LMA | 2-EH MA | Iso C10 MA | X-Lnk'r | | t-BHP, 100% basis |
|---|---|---|---|---|---|---|---|---|---|---|
| | | Monomer Ratio (wt %)* | | | | | | | mg/kg | (pphm) |
| 2.62 | 2907-38A | 35 | | 65 | | | | — | 0 | 0.0091 |
| 2.63** | 2907-82 | 35 | | 65 | | | | A | 500 | 0.0091 |
| 2.64 | 2788-81 | 80 | | 20 | | | | — | 0 | 0.0091 |
| 2.65*** | 2728-12 | 50 | | 50 | | | | A | 500 | 0.013 |
| 2.66 | 2728-100 | 50 | | 50 | | | | A | 500 | 0.0091 |
| 2.67 | 2907-48A | 9.5 | 24.5 | 66 | | | | A | 500 | 0.0091 |
| 2.68 | 2907-37A | 9.5 | 24.5 | 66 | | | | B | 730 | 0.0155 |
| 2.69 | 2607-060 | 55 | 35 | 10 | | | | — | 0 | 0.0091 |
| 2.70 | 2607-067 | | 40 | 50 | 10 | | | — | 0 | 0.0091 |
| 2.71 | 2803-01 | 25 | 22 | 18 | 35 | | | — | 0 | 0.0091 |
| 2.72 | 2907-38A | 35 | | 65 | | | | — | 0 | 0.013 |
| 2.73 | 2607-072 | 50 | | 50 | | | | — | 0 | 0.0091 |
| 2.74 | 2900-35A | 50 | | 50 | | | | A | 1000 | 0.013 |
| 2.75 | 2728-027 | | 10 | 90 | | | | — | 0 | 0.0091 |
| 2.76 | 2907-17A | 5 | 13 | 82 | | | | — | 0 | 0.0091 |
| 2.77 | 2907-16A | 9.5 | 24.55 | 66 | | | | — | 0 | 0.0091 |
| 2.78 | 2707-38A | 35 | | 65 | | | | — | 0 | 0.013 |
| 2.79 | 2728-050 | 65 | | | | 35 | | — | 0 | 0.0091 |
| 2.80 | 2728-051 | 65 | | | | | 35 | — | 0 | 0.0091 |
| 2.81 | 2820-04 | 35 | | 65 | | | | A | 500 | 0.013 |

IBXMA = isobornyl methacrylate;
IBMA = isobutyl methacrylate;
LMA = lauryl methacrylate;
SMA = stearyl methacrylate;
2-EH MA = 2-ethylhexyl methacrylate;
Iso C10 MA = iso decyl methacrylate;
Crosslinker "A" is 1,6-hexanediol diacrylate (1,6-HDDA);
Crosslinker B is trimethylolpropane triacrylate (TMPTA);
Crosslinker C is pentaerythritol allyl ether (PEAE);
t-BHP = t-butyl hydroperoxide.
*Percentage of monomer as a mass percent of the total amount of monomer
**Sample was spray dried using a Mobile Minor Spray Dryer from GEA with a rotary atomizer AF-05-A, made by Costruzioni Meccaniche Turbine with inlet temperature 145° C. and outlet temperature 78° C.

The oven dried powders were grinded and passed through 60 or 100 mesh before use in the following experiments. Powder can also be used without passing the 60-100 mesh screen but it would take longer time to dissolve.

Example 3. Thickening of Organic Liquids with Polymeric Rheology Modifiers of the Present Disclosure The thickening ability of various thickeners of the present disclosure (and certain comparative examples) in various organic liquids was studied. Each sample was prepared by adding 5% polymeric rheology modifier to 95% organic liquid and immediately mixing vigorously for about 15-30 minutes. Samples #134-151 and all comparative samples of Table 3 were prepared at ~70° C. for 15-30 minutes. Samples were placed at room temperature overnight and were shaken by hand before observation to generate air bubbles. Appearance of each sample at room temperature and thickening of each were observed and recorded in Table 3. The thickening was determined qualitatively and it could be easily compared to the original organic liquid by eye estimate. The thickening was observed by looking at how long bubbles remained suspended in the liquid after shaking. Generally, the bubbles rise to the surface quickly (less than ~10 seconds) in pure liquids after shaking because the viscosity of the oils are low (typically <100 mPas). If thickening occurs, the bubbles in a thickened organic liquid tend to remain suspended in the solution after shaking for at least more than a few minutes and in most cases at least 15 minutes longer than the bubbles in the liquid without thickener added. All samples in Table 3 were able to trap bubbles for more than 15 minutes longer than in the respective pure liquids except where indicated.

TABLE 3

Thickening of 95% organic liquid with 5% polymeric rheology modifier

| ID | Polymeric Rheology Modifier | Organic liquid | Chemical class of organic liquid | Appr at RT | Thickening at RT |
|---|---|---|---|---|---|
| 1 | 2.63 | d-limonene | Cyclic terpene | Clear | Yes. Trapped bubbles for 1 day |
| 2 | 2.25 | d-limonene | Cyclic terpene | Clear | Yes. Trapped bubbles for >15 mins |
| 3 | 2.64 | d-limonene | Cyclic terpene | Clear | Yes. Trapped bubbles for <15 mins |
| 4 | 2.43 | d-limonene | Cyclic terpene | Clear | Yes. Trapped bubbles for >30 mins |
| 5 | 2.12 | d-limonene | Cyclic terpene | Clear | Yes. Trapped bubbles for >30 mins |
| 6 | 2.20 | d-limonene | Cyclic terpene | Clear | Yes. Trapped bubbles for >30 mins |
| 7 | 2.21 | d-limonene | Cyclic terpene | Clear | Yes. Trapped bubbles for >30 mins |
| 8 | 2.55 | d-limonene | Cyclic terpene | Clear | Yes. Trapped bubbles for >30 mins |
| 9 | 2.56 | d-limonene | Cyclic terpene | Clear | Yes. Trapped bubbles for >30 mins |
| 10 | 2.57 | d-limonene | Cyclic terpene | Clear | Yes. Trapped bubbles for >30 mins |
| 11 | 2.58 | d-limonene | Cyclic terpene | Clear | Yes. Trapped bubbles for >30 mins |
| 12 | OleoCraft LP-20[Y] | d-limonene | Cyclic terpene | Clear | No |
| 13 | OleoCraft HP-31[Y] | d-limonene | Cyclic terpene | Clear | No |
| 14 | 2.63 | Sandalwood oil | Essential oil | Clear | Yes. Trapped bubbles for >16 hrs |
| 15 | 2.63 | Cedarwood oil | Essential oil | Clear | Yes. Trapped bubbles for >16 hrs |
| 16 | 2.63 | Chamomile oil | Essential oil | Clear | Yes. Trapped bubbles for >16 hrs |
| 17 | 2.63 | Vanilla oil | Essential oil | Clear | Yes. Trapped bubbles for >16 hrs |
| 18 | 2.63 | Tea tree oil | Essential oil | Clear | Yes. Trapped bubbles for >30 mins |
| 19 | 2.63 | Eucalyptus oil | Essential oil | Clear | Yes. Trapped bubbles for >8 hrs |
| 20 | 2.63 | Peppermint oil | Essential oil | Clear | Yes. Trapped bubbles for >16 hrs |
| 21 | 2.63 | Bergamot oil | Essential oil | Clear | Yes. Trapped bubbles for 8-16 hrs |
| 22 | 2.63 | Lavender oil | Essential oil | Clear | Yes. Trapped bubbles for >16 hrs |
| 23 | 2.63 | Rosemary oil | Essential oil | Clear | Yes. Trapped bubbles for >16 hrs |
| 24 | 2.63 | Rose oil | Essential oil | Clear | Yes. Trapped bubbles for >16 hrs |
| 25 | 2.63 | Cinnamon oil | Essential oil | Clear, a lot of small bubbles | Yes. Trapped bubbles for >16 hrs |
| 26 | 2.63 | Frankincense oil | Essential oil | Clear | Yes. Trapped bubbles for >16 hrs |
| 27 | 2.63 | Lemongrass oil | Essential oil | Clear | Yes. Trapped bubbles for 8-16 hrs |
| 28 | 2.63 | Geranium oil | Essential oil | Clear | Yes. Trapped bubbles for >16 hrs |
| 29 | 2.63 | Orange oil | Essential oil | Clear | Yes. Trapped bubbles for >16 hrs |
| 30 | 2.63 | Vetiver oil | Essential oil | Clear | Yes. Trapped bubbles for 8-16 hrs |
| 31 | 2.63 | Lemon oil | Essential oil | Clear | Yes. Trapped bubbles for >16 hrs |
| 32 | 2.63 | Jasmine oil | Essential oil | Clear | Yes. Trapped bubbles for 8-16 hrs |
| 33 | 2.63 | Cedar oil | Essential oil | Clear | Yes. Trapped bubbles for 8-16 hrs |
| 34 | 2.63 | Grapefruit oil | Essential oil | Pearlescent | Yes. Trapped bubbles for 1 hour |

TABLE 3-continued

Thickening of 95% organic liquid with 5% polymeric rheology modifier

| ID | Polymeric Rheology Modifier | Organic liquid | Chemical class of organic liquid | Appr at RT | Thickening at RT |
|---|---|---|---|---|---|
| 35 | 2.63 | Ylang Ylang oil | Essential oil | Clear | Yes. Trapped bubbles for 4 hour |
| 36 | 2.63 | Soy methyl ester | Ester | Clear | Yes |
| 37 | Intelimer 13-6 [Y] | Soy methyl ester | Ester | Wax with some liq | N/A |
| 38 | Dextrin Palmitate[Y] | Soy methyl ester | Ester | Paste | N/A |
| 39 | OleoCraft LP-20[Y] | Soy methyl ester | Ester | Clear gel | Yes |
| 40 | OleoCraft HP-31[Y] | Soy methyl ester | Ester | Hazy | No |
| 41 | 2.63 | Iisopropyl myristate (ISPM) | Ester | Clear, sl. purple | Yes |
| 42 | Intelimer 13-6[Y] | ISPM | Ester | Wax | N/A |
| 43 | Dextrin Palmitate[Y] | ISPM | Ester | Paste | N/A |
| 44 | OleoCraft LP-20[Y] | ISPM | Ester | Hazy gel | Yes |
| 45 | OleoCraft HP-31[Y] | ISPM | Ester | Hazy | No |
| 46 | 2.63 | C12/15 benzoate | Ester | Clear | Yes |
| 47 | Intelimer 13-6[Y] | C12/15 benzoate | Ester | Wax | N/A |
| 48 | Dextrin Palmitate[Y] | C12/15 benzoate | Ester | Clear Gel | Yes |
| 49 | 2.63 | Ethylene glycol butyl ether acetate | Alkylene glycol C1-C8 ether acetate | Clear | Yes |
| 50 | 2.63 | Diethylene glycol butyl ether acetate | Alkylene glycol C1-C8 ether acetate | Clear | Yes |
| 51 | 2.63 | 2-Butoxyethanol acetate | Ester | Clear | Yes. Trapped bubbles for >30 mins |
| 52 | 2.63 | Butyl acetate | Ester | Clear | Yes |
| 53 | 2.64 | Butyl acetate | Ester | Clear | Yes. Bubbles trapped for ~3-5 mins |
| 55 | 2.14 | Butyl acetate | Ester | Clear | Yes. Bubbles trapped for 15-30 mins |
| 56 | 2.52 | Butyl acetate | Ester | Clear | Yes. Bubbles trapped for 15-30 mins |
| 57 | 2.25 | Butyl acetate | Ester | Clear | Yes. Bubbles trapped for 15-30 mins |
| 58 | 2.56 | Butyl acetate | Ester | Clear | Yes. Bubbles trapped for 15-30 mins |
| 59 | 2.19 | Butyl acetate | Ester | Clear | Yes. Bubbles trapped for 30-90 mins |
| 60 | 2.67 | Butyl acetate | Ester | Clear | Yes. Bubbles trapped for 30-90 mins |
| 61 | 2.12 | Butyl acetate | Ester | Clear | Yes. Bubbles trapped for 30-90 mins |
| 62 | 2.3 | Butyl acetate | Ester | Clear | Yes. Bubbles trapped for 90-180 mins |
| 63 | 2.28 | Butyl acetate | Ester | Clear | Yes. Bubbles trapped for 90-180 mins |
| 64 | 2.13 | Butyl acetate | Ester | Clear | Yes. Bubbles trapped for 90-180 mins |
| 65 | 2.29 | Butyl acetate | Ester | Clear | Yes. Bubbles trapped for 90-180 mins |
| 66 | 2.57 | Butyl acetate | Ester | Clear | Yes. Bubbles trapped for 90-180 mins |
| 67 | 2.8 | Butyl acetate | Ester | Clear | Yes. Bubbles trapped for 90-180 mins |
| 68 | 2.43 | Butyl acetate | Ester | Clear | Yes. Bubbles trapped for 90-180 mins |
| 69 | 2.49 | Butyl acetate | Ester | Clear | Yes. Bubbles trapped for 90-180 mins |
| 70 | 2.21 | Butyl acetate | Ester | Clear | Yes. Bubbles trapped for >16 hrs |

TABLE 3-continued

Thickening of 95% organic liquid with 5% polymeric rheology modifier

| ID | Polymeric Rheology Modifier | Organic liquid | Chemical class of organic liquid | Appr at RT | Thickening at RT |
|---|---|---|---|---|---|
| 71 | 2.68 | Butyl acetate | Ester | Clear | Yes. Bubbles trapped for >16 hrs |
| 72 | 2.53 | Butyl acetate | Ester | Clear | Yes. Bubbles trapped for >16 hrs |
| 73 | 2.54 | Butyl acetate | Ester | Clear | Yes. Bubbles trapped for >16 hrs |
| 74 | 2.51 | Butyl acetate | Ester | Clear | Yes. Bubbles trapped for >16 hrs |
| 75 | 2.58 | Butyl acetate | Ester | Clear | Yes. Bubbles trapped for >16 hrs |
| 76 | 2.67 | Butyl acetate | Ester | Clear | Yes. Bubbles trapped for >16 hrs |
| 77 | 2.11 | Butyl acetate | Ester | Clear | Yes. Bubbles trapped for >16 hrs |
| 78 | 2.18 | Butyl acetate | Ester | Clear | Yes. Bubbles trapped for >16 hrs |
| 79 | 2.20 | Butyl acetate | Ester | Clear | Yes. Bubbles trapped for >16 hrs |
| 80 | 2.15 | Butyl acetate | Ester | Clear | Yes. Bubbles trapped for >16 hrs |
| 81 | 2.17 | Butyl acetate | Ester | Clear | Yes. Bubbles trapped for >16 hrs |
| 82 | 2.55 | Butyl acetate | Ester | Clear | Yes. Bubbles trapped for >16 hrs |
| 83 | OleoCraft LP-20[Y] | Butyl Acetate | Ester | Waxy | N/A |
| 84 | 2.63 | Ethyl acetate | Ester | Clear | Yes |
| 85 | 2.63 | Phenyl acetate | Ester | Clear | Yes |
| 86 | 2.25 | Methyl benzoate | Ester | Clear | Yes. Trapped bubbles for 15-30 mins |
| 87 | 2.58 | Methyl benzoate | Ester | Clear | Yes. Trapped bubbles for >30 mins |
| 88 | 2.64 | Methyl benzoate | Ester | Clear | Yes. Trapped bubbles for 15-30 mins |
| 89 | 2.55 | Methyl benzoate | Ester | Clear | Yes. Trapped bubbles for 2 days |
| 90 | 2.57 | Methyl benzoate | Ester | Clear | Yes. Trapped bubbles for 2 days |
| 91 | 2.63 | Methyl benzoate | Ester | Clear | Yes |
| 92 | 2.63 | Oxydiethylene dibenzoate | Ester | Clear | Yes |
| 93 | 2.63 | Acetyl tributyl citrate | Ester | Clear | Yes |
| 94 | 2.63 | Butyryltri-n-hexyl citrate | Ester | Clear | Yes |
| 95 | 2.63 | Tributyl citrate | Ester | Clear | Yes |
| 96 | 2.63 | methyl cocoate | Ester | Clear | Yes |
| 97 | 2.63 | 2-ethylhexyl lactate | Ester | Clear | Yes |
| 98 | 2.25 | Butyl lactate | Ester | Clear | Yes. Trapped bubbles for-15 mins |
| 99 | 2.64 | Butyl lactate | Ester | Clear | Yes. Trapped bubbles for <15 mins |
| 100 | 2.43 | Butyl lactate | Ester | Clear | Yes. Trapped bubbles for 15-30 mins |
| 101 | 2.12 | Butyl lactate | Ester | Clear | Yes. Trapped bubbles for 15-30 mins |
| 102 | 2.20 | Butyl lactate | Ester | Clear | Yes. Trapped bubbles for ~180 mins |
| 103 | 2.12 | Butyl lactate | Ester | Clear | Yes. Trapped bubbles for 2 days |
| 104 | 2.55 | Butyl lactate | Ester | Clear | Yes. Trapped bubbles for ~180 mins |
| 105 | 2.56 | Butyl lactate | Ester | Clear | Yes. Trapped bubbles for 15-30 mins |
| 106 | 2.24 | Butyl lactate | Ester | Hazy | No |
| 107 | 2.58 | Butyl lactate | Ester | Clear | Yes. Trapped bubbles for 15-30 mins |
| 108 | 2.63 | Isopropyl acetate | Ester | Clear | Yes |

TABLE 3-continued

Thickening of 95% organic liquid with 5% polymeric rheology modifier

| ID | Polymeric Rheology Modifier | Organic liquid | Chemical class of organic liquid | Appr at RT | Thickening at RT |
|---|---|---|---|---|---|
| 109 | 2.63 | Propyl lactate | Ester | Clear | Yes |
| 110 | 2.63 | Dimethyl adipate | Ester | Clear | Yes |
| 111 | 2.63 | Diethyl maleate | Ester | Clear | Yes |
| 112 | 2.63 | Methyl oleate | Ester | Clear | Yes |
| 113 | 2.63 | Diethyl succinate | Ester | Clear | Yes |
| 114 | 2.63 | Butyl 3-hydroxylbutanoate) | Ester | Clear | Yes. Trapped bubbles for 2 days |
| 115 | 2.63 | Methyl ester of C810 acid | Ester | Clear | Yes |
| 116 | 2.63 | Methyl propyl ether | Ether | Clear | Yes |
| 117 | 2.63 | Propylene glycol propryl ether | Ether | Clear | Yes. Trapped bubbles for >30 mins |
| 118 | 2.63 | Dipropylene glycol propryl ether | Ether | Clear | Yes. Trapped bubbles for >30 mins |
| 119 | 2.63 | 2-ethylhexyl acid | Fatty acid | Clear | Yes |
| 120 | 2.63 | Nonanoic acid | Fatty acid | Clear | Yes |
| 121 | 2.63 | Tall oil fatty acid | Fatty acid | Clear | Yes |
| 122 | 2.63 | Argon oil | Fatty acid & phenols | Clear | Yes |
| 123 | 2.63 | 1-methyl-2-pyrrolidone | Heterocyclic compounds | Clear | Yes |
| 124 | 2.63 | Tetrahydrofuran | Heterocyclic compounds | Clear | Yes |
| 125 | 2.63 | Morpholine | Heterocyclic compounds | Clear | Yes |
| 126 | 2.63 | 2-pyrrolidone, 1-dodecyl | Heterocyclic compounds | Clear | Yes |
| 127 | 2.63 | Phenyl trimethicone | Silicone oil | Clear liq, very viscous | Yes |
| 128 | Intelimer 13-6 [Y] | Phenyl trimethicone | Silicone oil | Hazy liq | No |
| 129 | Dextrin Palmitate [Y] | Phenyl trimethicone | Silicone oil | Hazy liq | No |
| 130 | 2.63 | Dow Corning 550 Fluid | Silicone oil with aromatic group | Clear | Yes. |
| 131 | OleoCraft LP-20 [Y] | Phenyl trimethicone | Silicone oil with aromatic group | Hazy | No |
| 132 | OleoCraft HP-31 [Y] | Phenyl trimethicone | Silicone oil with aromatic group | Hazy | No |
| 133 | 2.63 | Tributyl phosphate | Trialkyl phosphate | Clear | Yes. Trapped bubbles for 2 days |
| 134 | 2.63 | Soybean oil | Triglyceride | Clear | Yes |
| 135 | 2.63 | Glycerol tri-2-ethylhexanoate | Triglyceride | Clear | Yes |
| 136 | 2.63 | Glycerol triisostearate | Triglyceride | Translucent liquid | Yes |
| 137 | Intelimer 13-6 [Y] | Soybean oil | Triglyceride | Wax | N/A |
| 138 | Intelimer 13-6 [Y] | Glycerol tri-2-ethylhexanoate | Triglyceride | Paste | N/A |
| 139 | Intelimer 13-6 [Y] | Glyceroltri isostearate | Triglyceride | Wax | N/A |
| 140 | Dextrin Palmitate [Y] | Soybean oil | Triglyceride | hazy liq with Fish eyes | Slightly Thickened |
| 141 | Dextrin Palmitate [Y] | Glycerol tri-2-ethyl hexanoate | Triglyceride | Paste | N/A |
| 142 | Dextrin Palmitate [Y] | Glycerol tri isostearate | Triglyceride | Paste with fish eyes | N/A |
| 143 | 2.63 | Corn oil | Triglyceride | Clear | Yes |
| 144 | OleoCraft LP-20 [Y] | Soy Oil gel | Triglyceride | Sl. hazy | Yes |

TABLE 3-continued

Thickening of 95% organic liquid with 5% polymeric rheology modifier

| ID | Polymeric Rheology Modifier | Organic liquid | Chemical class of organic liquid | Appr at RT | Thickening at RT |
|---|---|---|---|---|---|
| 145 | OleoCraft HP-31 [Y] | Soy Oil | Triglyceride | Not dissolved | No |
| 146 | 2.63 | Soybean oil | Triglyceride | Clear | Yes |
| 147 | 2.63 | Rapeseed oil | Triglyceride | Clear | Yes |
| 148 | 2.63 | Canola oil | Triglyceride | Clear | Yes |
| 149 | 2.63 | Linseed oil | Triglyceride | Clear | Yes. Trapped bubbles for >30 mins |
| 150 | 2.63 | Macadamia oil | Triglyceride | Clear | Yes. |
| 151 | 2.63 | Argan oil | Triglyceride | Clear | Yes. Trapped bubbles for >15 mins |
| 152 | 2.63 | Caprylic capryl triglyceride | Triglyceride | Clear | Yes. Trapped bubbles for >1 hr |
| 153 | 2.63 | Mineral Spirits | Turpentine | Clear | Yes |
| 154 | 2.63 | Pine oil | Turpentine | Clear | Yes |
| 155 | 2.63 | Acetochlor | Pesticide | Clear | Yes |
| 156 | 2.63 | 2,4-D octyl ester | Pesticide | Clear | Yes |
| 157 | 2.63 | MCPA 2EH ester | Pesticide | Clear | Yes |
| 158 | 2.63 | Butochlor | Pesticide | Clear | Yes |
| 159 | 2.63 | Isostearyl alcohol | Alcohol | Hazy liquid | Clear and thickened at >45° C. |
| 160 | Intelimer 13-6 [Y] | Isostearyl alcohol | Alcohol | Wax. 45° C. wax. | N/A |
| 161 | Dextrin Palmitate [Y] | Isostearyl alcohol | Alcohol | Paste. 45° C. clear no thickening | N/A |
| 162 | 2.63 | n-Butanol | Alcohol | Clear | Yes. Trapped bubbles for >30 mins |
| 163 | 2.63 | Hexanol | Alcohol | Clear | Yes |
| 164 | 2.63 | 2-ethylhexyl alcohol | Alcohol | Clear | Yes |
| 165 | 2.63 | Branched C9 alcohol | Alcohol | Clear | Yes |
| 166 | 2.63 | Decanol | Alcohol | Clear | Yes |
| 167 | 2.63 | Stearyl alcohol 15-polypropoxylate | Alcohol alkoxylate | Translucent liquid | Yes |
| 168 | Intelimer 13-6 [Y] | Stearyl alcohol 15-polypropoxylate | Alcohol alkoxylate | Wax | N/A |
| 169 | Dextrin Palmitate [Y] | Stearyl alcohol 15-polypropoxylate | Alcohol alkoxylate | Hazy liq | No |
| 170 | 2.63 | 2-ethylhexyl alcohol-4EO | Alcohol alkoxylate | Clear | Yes |
| 171 | 2.63 | Butanol-1EO | Alcohol alkoxylate | Clear | Yes. Trapped bubbles for >30 mins |
| 172 | 2.25 | Butanol-1EO | Alcohol alkoxylate | Clear | Yes. Trapped bubbles for 15-30 mins |
| 173 | 2.64 | Butanol-1EO | Alcohol alkoxylate | Clear | Yes. Trapped bubbles for ~5 mins. |
| 174 | 2.43 | Butanol-1EO | Alcohol alkoxylate | Clear | Yes. Trapped bubbles for >30 mins |
| 175 | 2.12 | Butanol-1EO | Alcohol alkoxylate | Clear | Yes. Trapped bubbles for 15-30 mins |
| 176 | 2.20 | Butanol-1EO | Alcohol alkoxylate | Clear | Yes. Trapped bubbles for 15-30 mins |
| 177 | 2.21 | Butanol-1EO | Alcohol alkoxylate | Clear | Yes. Trapped bubbles for 15-30 mins |
| 178 | 2.55 | Butanol-1EO | Alcohol alkoxylate | Clear | Yes. Trapped bubbles for 20 mins |
| 179 | 2.56 | Butanol-1EO | Alcohol alkoxylate | Clear | Yes. Trapped bubbles for 15-30 mins |
| 180 | 2.57 | Butanol-1EO | Alcohol alkoxylate | Clear | Yes. Trapped bubbles for 10 mins |
| 181 | 2.58 | Butanol-1EO | Alcohol alkoxylate | Clear | Yes. Trapped bubbles for 10 mins |
| 182 | 2.63 | Methyl ethyl ketone | Alkyl methyl ketone | Clear | Yes. Bubbles trapped for >16 hrs |

TABLE 3-continued

Thickening of 95% organic liquid with 5% polymeric rheology modifier

| ID | Polymeric Rheology Modifier | Organic liquid | Chemical class of organic liquid | Appr at RT | Thickening at RT |
|---|---|---|---|---|---|
| 183 | 2.63 | N,N,2-trimethyl-propinamide | Alkyldimethylamide | Clear | Yes |
| 184 | 2.63 | N,N,-diethyl propinamide | Alkyldimethylamide | Clear | Yes |
| 185 | 2.63 | N,N-dimethyldecanamide | Alkyldimethylamide | Clear | Yes |
| 186 | 2.63 | Tallow nitrile | Alkylnitrile | Clear | Yes |
| 187 | 2.63 | Butylamine | Amine | Clear | Yes |
| 188 | 2.63 | Cocoamine | Amine | Clear | Yes |
| 189 | 2.63 | Benzene | Aromatic compound | Clear | Yes |
| 190 | 2.63 | Toluene | Aromatic compound | Clear | Yes |
| 191 | 2.63 | Xylene | Aromatic compound | Clear | Yes |
| 192 | 2.56 | Xylene | Aromatic compound | Clear | Yes. Trapped bubbles for 15-30 mins |
| 193 | 2.63 | Solvent Naphtha, Heavy Aromatic | Aromatic compound | Clear | Yes |
| 194 | 2.63 | Butyloctyl Salicylate | Aromatic compound | Clear | Yes. Trapped bubbled for 2 hrs |
| 196 | 2.63 | Phenol ethoxylate | Aromatic compound | Clear | Yes. Trapped bubbles for >30 mins |
| 197 | 2.63 | Methylene chloride | Chlorine substituted hydrocarbons | Clear | Yes |
| 198 | 2.63 | Chloroform | Chlorine substituted hydrocarbons | Clear | Yes |

[Y] Comparative Example

Intelimer 13-6, dextrin palmitate, OleoCraft LP-20, and OleoCraft HP-31 are known oil thickeners and are comparative examples. As shown, most of these comparative example thickeners fail to thicken the tested organic liquids, and in many cases created an undesirable and unusable wax or a paste. In some limited cases OleoCraft LP-20 showed some thickening ability, but failed to thicken across the wide variety and range of organic liquids that the polymeric rheology modifiers of the disclosure exhibited. Even for organic liquids that are very difficult to thicken such as isostearyl alcohol, the polymeric rheology modifiers of the invention exhibited thickening ability at slightly elevated temperatures (unlike the comparative examples). Sample 2.59 contains a very high level of cross-linker, which limits the effectiveness of this sample as a thickener in some cases.

Example 4. Polymeric Rheology Modifier Thickening Performance in Fatty Acid Esters The viscosity of exemplary polymeric rheology modifiers in soy methyl ester (SME) was measured. SME is a clear low viscosity liquid with a viscosity of about 3-8 mPas at room temperature. Increased viscosity is indicative of thickening ability of the rheology modifier being analysed.

TABLE 4

Thickened SME Oil with Exemplary Polymeric Rheology Modifiers

| Lot # | SME wt % | Polymeric Rheology Modifier | Polymeric Rheology Modifier, wt % | Brookfield Viscosity, mPas | | | | Viscosity Ratio of 10:100 rpm |
|---|---|---|---|---|---|---|---|---|
| | | | | 10 rpm | 20 rpm | 50 rpm | 100 rpm | |
| 2716-7-1 | 97 | 1 | 3 | 640 | 440 | 288 | 216 | 2.96 |
| 2716-7-6 | 97 | 2.7 | 3 | 560 | 360 | 248 | 188 | 2.98 |
| 2716-7-7 | 97 | 2.37 | 3 | 360 | 260 | 200 | 156 | 2.31 |
| 2716-7-8 | 97 | 2.26 | 3 | 600 | 440 | 304 | 240 | 2.50 |
| 2716-14-4 | 97 | 2.28 | 3 | 510 | 365 | 244 | 188 | 2.71* |
| 2716-14-5 | 97 | 2.27 | 3 | 450 | 320 | 208 | 158 | 2.85* |
| 2729-95-1 | 97 | 2.16 | 3 | 330 | 245 | 170 | 134 | 2.46 |
| 2729-95-4 | 97 | 2.8 | 3 | 360 | 265 | 184 | 145 | 2.48 |
| 2729-95-7 | 97 | 2.11 | 3 | 240 | 185 | 132 | 109 | 2.20 |
| 2729-95-10 | 97 | 2.12 | 3 | 630 | 460 | 318 | 248 | 2.54 |
| 2729-95-15 | 95.8 | 2.13 | 4.2 | 1230 | 875 | 568 | 379 | 3.25 |
| 2729-95-16 | 97 | 2.21 | 3 | 260 | 220 | 145 | 115 | 2.26 |

TABLE 4-continued

Thickened SME Oil with Exemplary Polymeric Rheology Modifiers

| Lot # | SME wt % | Polymeric Rheology Modifier | Polymeric Rheology Modifier, wt % | Brookfield Viscosity, mPas | | | | Viscosity Ratio of 10:100 rpm |
|---|---|---|---|---|---|---|---|---|
| | | | | 10 rpm | 20 rpm | 50 rpm | 100 rpm | |
| 2741-1-2 | 96.4 | 2.18 | 3.6 | 360 | 260 | 170 | 130 | 2.77 |
| 2741-1-5 | 96.4 | 2.17 | 3.6 | 350 | 255 | 168 | 125 | 2.80 |
| 2741-1-9 | 95.8 | 2.15 | 4.2 | 570 | 400 | 262 | 189 | 3.02 |
| 2741-1-12 | 95.8 | 2.19 | 4.2 | 1190 | 850 | 556 | 412 | 2.89 |
| 2741-1-15 | 95.8 | 2.20 | 4.2 | 700 | 475 | 300 | 218 | 3.21 |
| 2741-1-16 | 97 | 2.21 | 3 | 260 | 220 | 145 | 115 | 2.26 |
| 2741-16-3 | 97 | 2.29 | 3 | 480 | 350 | 230 | 177 | 2.71 |
| 2741-16-2 | 97 | 2.50 | 3 | 400 | 325 | 246 | 197 | 2.03 |
| 2741-16-6 | 97 | 2.52 | 3 | 480 | 370 | 272 | 215 | 2.23 |
| 2741-16-7 | 97 | 2.53 | 3 | 270 | 225 | 162 | 130 | 2.08 |
| 2741-16-8 | 97 | 2.54 | 3 | 260 | 205 | 148 | 119 | 2.18 |
| 2741-16-10 | 97 | 2.56 | 3 | 400 | 305 | 222 | 172 | 2.33 |
| 2741-16-11 | 97 | 2.47 | 3 | 550 | 380 | 290 | 204 | 2.70 |
| 2716-7-4 | 97 | 2.2 | 3 | 520 | 420 | 296 | 232 | 2.24 |
| 2716-7-3 | 97 | 2.3 | 3 | 280 | 220 | 160 | 120 | 2.33 |
| 2761-66-2 | 97 | 2.25 | 3 | 771 | 621 | 475 | N/A | |
| 2761-66-6 | 97 | 2.65 | 3 | 771 | 621 | 475 | N/A | |

*Viscosity measured 1 day after preparation at 27.5° C.

Viscosity of the lots above was measured using a standard Brookfield viscometer process well known to those skilled in the art. Viscosities for the samples in this Example 4 were measured with a Brookfield DV-I Prime viscometer at 22° C. Lot numbers designated 2716-7-x were measured with a #4 spindle. All other samples in this Example 3 were measured with a #3 spindle. The polymeric rheology modifiers were dispersed slowly into SME under adequate agitation and were dissolved fully with agitation before the viscosity measurement.

The results in this Table 4 show that the rheology modifiers shown in Example 4 are able to thicken SME and the thickened organic liquid compositions display shear thinning property (e.g. viscosity is lower at higher shear rate). High shear thinning property is an advantageous property and is believed to be associated with the ability of the polymeric rheology modifier to suspend solids.

Example 5. Additional Thickening Properties in Mixed Organic Liquids

The viscosities of a thickened organic liquid composition containing soy methyl ester and soy oil in this Example were measured with a Brookfield DV-II+ Pro viscometer with spindle #64 at 22° C.

TABLE 5

Thickened organic liquids (SME and Soybean Oil) with Exemplary Polymeric Rheology Modifiers Brookfield DV-II + Pro spindle #64.

| Sample | SME wt % | Soy oil wt % | Polymeric rheology modifier (4.76%) | Comment (visual) | Viscosity (mPas). 3 days at RT | | | |
|---|---|---|---|---|---|---|---|---|
| | | | | | 100 rpm | 50 rpm | 20 rpm | 10 rpm |
| 2716-2-9 | 95.24 | | 2.25 | Clear appearance. Short hydration time. Fish eyes occur with slow mixing time. | 1120 | 1392 | 1950 | 2300 |
| 2716-2-10 | 95.24 | | 1 | Clear appearance. Short hydration time. | 700 | 900 | 1650 | 2500 |
| 2716-2-11 | 47.62 | 47.62 | 2.25 | Clear appearance. Short hydration time. | 1700 | 2100 | 2790 | 3659 |
| 2716-2-12 | 47.62 | 47.62 | 1 | Clear appearance. Short hydration time. Thickened 1 hour to create clear appearance. | | | | |
| 2716-2-13 | 14.29 | 80.95 | 2.25 | | 3000 | 3479 | 4350 | 5300 |

TABLE 5-continued

Thickened organic liquids (SME and Soybean Oil) with Exemplary Polymeric Rheology Modifiers Brookfield DV-II + Pro spindle #64.

| Sample | SME wt % | Soy oil wt % | Polymeric rheology modifier (4.76%) | Comment (visual) | Viscosity (mPas). 3 days at RT | | | |
|---|---|---|---|---|---|---|---|---|
| | | | | | 100 rpm | 50 rpm | 20 rpm | 10 rpm |
| 2716-2-14 | 14.29 | 80.95 | 1 | 1 hour to create clear appearance. Thickened | | | | |
| 2716-2-15 | 23.81 | 71.43 | 1 | 30 mins to create clear appearance. Thickened | | | | |

Table 5 shows that the rheology modifiers of the present disclosure can thicken mixtures of SME and soybean oil.

Example 6. Cross-linking Effect of IBXMA-Styrene-IBMA-LMA Polymeric Rheology Modifier The viscosities of a cross linked and a non-cross linked IBXMA-styrene-IBMA-LMA polymeric rheology modifier were measured using an Anton Paar MCR302 rheometer.

The viscosity of RME at 20° C. is 5.3-7.9 mPas, which is much lower than the viscosities of the example 6 samples. The result in this example shows that both thickeners 2803-01 (non-cross-linked) and 2900-37A (200 ppm cross-linked) can thicken RME with a shear thinning property. The cross-linked version had a higher viscosity and higher shear thinning property compared to the non-cross-linked version. For the purpose of suspending solid particles in organic liquids, the polymeric rheology modifiers of the disclosure preferably is cross-linked.

TABLE 6

Viscosity of IBXMA-Styrene-IBMA-LMA Polymeric Rheology Modifier with and without crosslinking in Samples of 5% in rapeseed methyl ester (RME).

| Shear rate, 1/s | 5% Thickener 2.71 (no cross linking) in RME Viscosity, mPas | 5% Thickener 2.68 (200 ppm cross linking) in RME Viscosity, mPas |
|---|---|---|
| 0.1 | 1860 | 2770 |
| 0.134 | 1880 | 2780 |
| 0.18 | 1870 | 2740 |
| 0.241 | 1860 | 2700 |
| 0.324 | 1850 | 2640 |
| 0.434 | 1830 | 2570 |
| 0.582 | 1800 | 2490 |
| 0.781 | 1770 | 2380 |
| 1.05 | 1720 | 2270 |
| 1.41 | 1660 | 2150 |
| 1.89 | 1600 | 2030 |
| 2.53 | 1530 | 1900 |
| 3.39 | 1450 | 1780 |
| 4.55 | 1370 | 1660 |
| 6.11 | 1290 | 1550 |
| 8.19 | 1200 | 1430 |
| 11 | 1110 | 1320 |
| 14.7 | 1030 | 1210 |
| 19.8 | 945 | 1110 |
| 26.5 | 865 | 1010 |
| 35.6 | 790 | 917 |
| 47.7 | 722 | 829 |
| 64 | 662 | 745 |
| 85.8 | 607 | 668 |
| 115 | 552 | 601 |
| 154 | 498 | 541 |
| 207 | 446 | 490 |
| 278 | 400 | 446 |
| 373 | 357 | 410 |
| 500 | 318 | 375 |
| Ratio of 0.1/500 | 5.85 | 7.39 |

Example 7. Cross-linking Effect of IBXMA-IBMA Polymeric Rheology Modifier

The viscosities of a cross linked and a non-cross linked IBXMA-IBMA polymeric rheology modifier were measured using an Anton Paar MCR302 rheometer.

TABLE 7

Thickening ability of IBXMA:IBMA = 50:50 polymeric rheology modifier (5%) with various degrees of cross-linking in rapeseed methyl ester (RME).

| | Sample # | | | | |
|---|---|---|---|---|---|
| | 2.73 | 2.25 | 1 | 1 | 2.32 |
| | | | Cross Linking level | | |
| Shear Rate, 1/s | 0 ppm Viscosity, mPas | 204 ppm Viscosity, mPas | 500 ppm Viscosity, mPas | 1000 ppm Viscosity, mPas | 2000 ppm Viscosity, mPas |
| 0.1 | 1820 | 5550 | 14400 | 9110 | 3890 |
| 0.134 | 1840 | 4930 | 11000 | 7160 | 3170 |
| 0.18 | 1830 | 4470 | 9040 | 5800 | 2630 |
| 0.241 | 1820 | 4030 | 7470 | 4700 | 2190 |
| 0.324 | 1810 | 3630 | 6190 | 3830 | 1820 |
| 0.434 | 1790 | 3270 | 5130 | 3180 | 1520 |
| 0.582 | 1770 | 2950 | 4270 | 2710 | 1270 |
| 0.781 | 1740 | 2670 | 3560 | 2340 | 1070 |
| 1.05 | 1700 | 2420 | 2980 | 2060 | 894 |
| 1.41 | 1650 | 2200 | 2500 | 1830 | 752 |
| 1.89 | 1600 | 2020 | 2110 | 1620 | 634 |
| 2.53 | 1530 | 1850 | 1790 | 1390 | 535 |
| 3.39 | 1460 | 1690 | 1520 | 1170 | 453 |
| 4.55 | 1380 | 1550 | 1300 | 968 | 384 |
| 6.11 | 1290 | 1420 | 1120 | 799 | 327 |
| 8.19 | 1200 | 1300 | 967 | 650 | 279 |
| 11 | 1100 | 1180 | 837 | 520 | 240 |
| 14.7 | 1010 | 1080 | 712 | 411 | 206 |
| 19.8 | 915 | 978 | 546 | 324 | 179 |
| 26.5 | 825 | 877 | 481 | 261 | 156 |
| 35.6 | 739 | 788 | 440 | 220 | 137 |
| 47.7 | 659 | 704 | 412 | 191 | 121 |
| 64 | 585 | 628 | 395 | 173 | 107 |
| 85.8 | 520 | 557 | 397 | 160 | 96.5 |
| 115 | 462 | 494 | 365 | 150 | 87.4 |
| 154 | 412 | 437 | 334 | 143 | 80 |
| 207 | 367 | 389 | 306 | 141 | 74.1 |
| 278 | 327 | 353 | 279 | 154 | 69.2 |
| 373 | 292 | 322 | 255 | 144 | 65.2 |
| 500 | 262 | 295 | 231 | 134 | 61.8 |

| | Sample # | | | | | | | |
|---|---|---|---|---|---|---|---|---|
| | 2.73 | 2.73 | 2.25 | 2.25 | Thickener 1 | Thickener 1 | 2.31 | 2.31 |
| | | | | Cross Linking Level | | | | |
| | 0 ppm | 0 ppm | 204 ppm | 204 ppm | 500 ppm | 500 ppm | 1000 ppm | 1000 ppm |
| | | | | Added Emulsifier* | | | | |
| Shear Rate, [1/s] | No Viscosity, mPas | Yes Viscosity, mPas | No Viscosity, mPas | Yes Viscosity, mPas | No Viscosity, mPas | Yes Viscosity, mPas | No Viscosity, mPas | Yes Viscosity, mPas |
| 0.1 | 1820 | 2140 | 5550 | 6080 | 14400 | 11100 | 9110 | 9060 |
| 0.134 | 1840 | 2160 | 4930 | 5400 | 11000 | 8720 | 7160 | 7160 |
| 0.18 | 1830 | 2170 | 4470 | 4860 | 9040 | 7310 | 5800 | 5900 |
| 0.241 | 1820 | 2160 | 4030 | 4370 | 7470 | 6120 | 4700 | 4850 |
| 0.324 | 1810 | 2160 | 3630 | 3930 | 6190 | 5130 | 3830 | 4000 |
| 0.434 | 1790 | 2140 | 3270 | 3540 | 5130 | 4320 | 3180 | 3300 |
| 0.582 | 1770 | 2120 | 2950 | 3190 | 4270 | 3640 | 2710 | 2740 |
| 0.781 | 1740 | 2080 | 2670 | 2880 | 3560 | 3080 | 2340 | 2270 |
| 1.05 | 1700 | 2030 | 2420 | 2610 | 2980 | 2610 | 2060 | 1880 |
| 1.41 | 1650 | 1970 | 2200 | 2380 | 2500 | 2220 | 1830 | 1570 |
| 1.89 | 1600 | 1890 | 2020 | 2170 | 2110 | 1890 | 1620 | 1320 |
| 2.53 | 1530 | 1810 | 1850 | 1980 | 1790 | 1630 | 1390 | 1110 |

TABLE 7-continued

Thickening ability of IBXMA:IBMA = 50:50 polymeric rheology modifier
(5%) with various degrees of cross-linking in rapeseed methyl ester (RME).

| | | | | | | | | |
|---|---|---|---|---|---|---|---|---|
| 3.39 | 1460 | 1710 | 1690 | 1810 | 1520 | 1410 | 1170 | 942 |
| 4.55 | 1380 | 1610 | 1550 | 1660 | 1300 | 1230 | 968 | 803 |
| 6.11 | 1290 | 1500 | 1420 | 1520 | 1120 | 1070 | 799 | 690 |
| 8.19 | 1200 | 1390 | 1300 | 1400 | 967 | 943 | 650 | 597 |
| 11 | 1100 | 1270 | 1180 | 1270 | 837 | 834 | 520 | 519 |
| 14.7 | 1010 | 1160 | 1080 | 1160 | 712 | 745 | 411 | 455 |
| 19.8 | 915 | 1050 | 978 | 1050 | 546 | 669 | 324 | 402 |
| 26.5 | 825 | 944 | 877 | 955 | 481 | 606 | 261 | 358 |
| 35.6 | 739 | 846 | 788 | 861 | 440 | 552 | 220 | 322 |
| 47.7 | 659 | 755 | 704 | 774 | 412 | 504 | 191 | 292 |
| 64 | 585 | 673 | 628 | 694 | 395 | 462 | 173 | 266 |
| 85.8 | 520 | 600 | 557 | 621 | 397 | 424 | 160 | 244 |
| 115 | 462 | 537 | 494 | 555 | 365 | 389 | 150 | 225 |
| 154 | 412 | 482 | 437 | 496 | 334 | 357 | 143 | 208 |
| 207 | 367 | 431 | 389 | 446 | 306 | 327 | 141 | 192 |
| 278 | 327 | 386 | 353 | 406 | 279 | 301 | 154 | 179 |
| 373 | 292 | 348 | 322 | 373 | 255 | 277 | 144 | 166 |
| 500 | 262 | 316 | 295 | 344 | 231 | 257 | 134 | 155 |

This result indicates that cross-linking can improve the thickening performance with larger shear thinning property. Above a certain concentration of cross-linker, the viscosity begins to fall.

Example 8. IBXMA:IBMA=50:50 Polymeric Rheology Modifier Interaction with Emulsifiers The polymeric rheology modifiers of the disclosure perform well as thickeners both in the presence and in the absence of emulsifiers typically used in the art. Thickeners 2.73, 2.25, 1, and 2.31 were analysed in 5% RME in the presence of a 50:50 emulsifier mixture of Emulpon CO-200 castor oil ethoxylates and Witconate P-1220EH calcium dodecyl benzene sulfonate (60%). Viscosity and shear rate was measured according to the procedures discussed above in Examples 6 and 7.

Table 8. Thickening performance of IBXMA:IBMA=50:50 polymeric rheology modifiers in rapeseed methyl ester, 5% polymer, with and without added emulsifier (5%)

*Emulsifier is a 1:1 blend of Witconate P1460EH and Emulpon CO-200

The result shows that emulsifiers Emulpon CO-200 and Witconate P-1460EH do not significantly affect the thickening performance of the polymeric rheology modifiers of the disclosure.

Example 9 Styrene:IBMA:LMA=40:50:10 Polymeric Rheology Modifier Interaction with Emulsifiers

TABLE 9

Thickening performance of a polymeric rheology modifier Thickener 2.1 (2607-71), Styrene: IBMA:LMA = 40:50:10 (104 ppm cross linker), in soy methyl ester in the presence of emulsifiers.

| Smpl # | 2716-7-14 | 2716-7-5 |
|---|---|---|
| SME wt % | 90.25 | 97 |
| Thickener 2.1 wt % | 3 | 3 |
| Emulsifier* wt % | 6.75 | 0 |

| Brookfield DV-I Prime Spindle 4, Viscosity, at 22° C. | | |
|---|---|---|
| RPM | Visc, m Pas | Visc, mPas |
| 100 | 480 | 460 |
| 50 | 576 | 560 |
| 20 | 720 | 700 |
| 10 | 840 | 800 |

Emulsifier = Witconate P1220EH:Armotan AL6966:Ethylan NS500LQ (20:60:20).

The data in Table 9 illustrates that the presence of an emulsifier does not affect the thickening performance of the polymeric rheology modifiers of the disclosure.

Example 10. Polymeric Rheology Modifiers Formulated with Talc Model Powder

The ability of fatty acid ester formulations containing polymeric rheology modifiers of the disclosure to suspend powder was analysed using talc model powder. Talc model powder (Talc-Luzena c 10 mo, particle size<10 microns) was formulated in soy methyl ester (SME) as set forth below. Viscosity and shear thinning values were measured according to the procedures set forth above.

A sample was considered to suspend particles if the sample had less than 10% top clear after 14 days at 50° C. with a polymeric rheology modifier concentration of less than 4 wt % of the total formulation. Top clear means the top portion of the composition containing no solid particle as visually observed and as measured in relation to the total composition height.

TABLE 10A

Thickened Organic Liquid Compositions Stabilizing Talc Powder

| Sample # | SME, wt % | Talc, wt % | Polymer (mg/kg XL) | wt % of polymer | Appearance after 14 days at 50° C. | Lot # |
|---|---|---|---|---|---|---|
| Control | 85 | 15 | | | Easy to disperse but talc particles settled quickly. | |
| 10.1 | 80.5 | 17 | 2.16 (502) | 2.5 | No separation after 14 days at 50° C. | 2729-95-1T |
| 10.2 | 80.5 | 17 | 2.8 (500) | 2.5 | No separation after 14 days at 50° C. 5% top clear and no sediment after 60 days at 50° C. | 2729-95-4T |
| 10.3 | 80.5 | 17 | 2.11 (650) | 2.5 | No separation after 14 days at 50° C. | 2729-95-7T |
| 10.4 | 80.5 | 17 | 2.12 (350) | 2.5 | No separation after 14 days at 50° C. | 2729-95-10T |
| 10.5 | 79.5 | 17 | 2.13 (650) | 3.5 | No separation after 14 days at 50° C. | 2729-9S-15T |
| 10.6 | 80 | 17 | 2.21(465.3) | 3 | No separation after 14 days at 50° C. | 2729-95-17T |
| 10.7 | 80.5 | 17 | 2.10 (500) | 2.5 | 5% top clear and no sediment after 60 days at 50° C. | 2716-19-5 |
| 10.8 | 80.5 | 17 | 2.27 (500) | 2.5 | No separation after 60 days at 50° C. | 2716-19-6 |
| 10.9 | 82 | 15 | 2.6 (200) | 3 | No separation | 2903-69-7 |
| 10.10 | 80 | 17 | 2.47 (500) | 3 | No separation | 2716-17-1 |
| 10.11 | 80 | 17 | 2.43 (500) | 3 | No separation | 2716-17-2 |
| 10.12 | 80 | 17 | 2.27 (500) | 3 | No separation | 2716-17-3 |
| 10.13 | 80 | 17 | 2.18 (465.3) | 3 | 1.8% top clear after weeks at 50° C. | 22741-1-2T |
| 10.14 | 80 | 17 | 2.17 (756) | 3 | No separation after 2 weeks at 50° C. | 2741-1-5T |
| 10.15 | 79.5 | 17 | 2.20 (1046.8) | 3.5 | 2% top clear after 2 weeks at 50° C. | 2741-1-15T |
| 10.16 | 79.5 | 17 | 2.22 (1500) | 3.50% | 3.6% top clear and no sediment after 14 days at 50° C. | 2741-34-2 |
| 10.17 | 79.5 | 17 | 2.23 (2000) | 3.50% | 72.7% top clear after 14 days at 50° C. | 2741-34-4 |
| 10.18 | 79.5 | 17 | 2.62 (0) | 3.50% | 69.8% top clear after 14 days at 50° C. | 2741-22-2 |
| 10.19 | 79.5 | 15 | 2.24 (3000) | 3.50% | 72.7% top clear after 14 days at 50° C. | 2741-22-4 |
| 10.20 | 82 | 17 | 2.25 (204) | 3.00% | 5.7% top clear and no sediment after 14 days at 50° C. | 2903-87-2 |
| 10.21 | 80 | 17 | 2.21 | 3 | 1.8% top clear | 2741-1-17T |
| 10.22 | 83 | 15 | 2.73 (0) | 2 | 70% top clear | |
| 10.23 | 82 | 15 | 2.73 (0) | 3 | 23.3% top clear | |
| 10.24 | 81 | 15 | 2.73 (0) | 4 | 15% top clear | |
| 10.25 | 83 | 15 | 2.25 (204) | 2 | 5.6% top clear | |
| 10.26 | 82 | 15 | 2.25 (204) | 3 | 5.7% top clear | |
| 10.27 | 81 | 15 | 2.25 (204) | 4 | 5.4% top clear | |
| 10.28 | 83 | 15 | 1 (500) | 2 | 5.4% top clear | |
| 10.29 | 82 | 15 | 1 (500) | 3 | No separation | |
| 10.30 | 81 | 15 | 1 (500) | 4 | No separation | |
| 10.31 | 83 | 15 | 2.31 (1000) | 2 | 44.7% top clear | |
| 10.32 | 82 | 15 | 2.31 (1000) | 3 | 5% top clear | |
| 10.33 | 81 | 15 | 2.31 (1000) | 4 | No separation | |
| 10.34 | 82 | 15 | 2.32 (2000) | 3 | 44% top clear | |
| 10.35 | 81 | 15 | 2.32 (2000) | 4 | No separation | |

The amount of cross-linker in the polymer and the amount of polymer in the formulation can be adjusted to achieve optimum thickening for a particular application and optimum suspension of particulates.

TABLE 10B

Viscosities of Table 10A Formulations

Brookfield DV-I Prime Spindle 4 viscosity, mPas

|  | History | 10 rpm | 20 rpm | 50 rpm | 100 rpm |
|---|---|---|---|---|---|
| Control | 1 day at RT | Separated. | | | |
| 2729-95-1T | 2 days at RT | 890 | 615 | 398 | 297 |
|  | 14 days at 50° C. | 980 | 680 | 446 | 339 |
| 2729-95-4T | 2 days at RT | 840 | 595 | 396 | 303 |
|  | 14 days at 50° C. | 950 | 670 | 442 | 349 |
| 2729-95-7T | 2 days at RT | 640 | 415 | 300 | 236 |
|  | 14 days at 50° C. | 720 | 575 | 352 | 289 |
| 2729-95-10T | 2 days at RT | 940 | 685 | 478 | 371 |
|  | 14 days at 50° C. | 1000 | 720 | 494 | 356 |
| 2729-95-15T | 2 days at RT | 1600 | 1145 | 754 | 541 |
|  | 14 days at 50° C. | 1710 | 1220 | 810 | 613 |

TABLE 10B-continued

Viscosities of Table 10A Formulations

Brookfield DV-I Prime Spindle 4 viscosity, mPas

|  | History | 10 rpm | 20 rpm | 50 rpm | 100 rpm |
|---|---|---|---|---|---|
| 2729-95-17T | 1 day at RT | 790 | 555 | 366 | 272 |
| 2716-19-4 | 60 days at 50° C. | 880 | 620 | 410 | 310 |
| 2716-19-5 | 60 days at 50° C. | 860 | 600 | 400 | 300 |
| 2716-19-6 | 60 days at 50° C. | 780 | 560 | 366 | 278 |
| 2903-69-7 | 1 day at RT | 700 | | | |
| 2716-17-1 | 7 days at 50° C. | 1660 | 1170 | 736 | 536 |
| 2716-17-2 | 7 days at 50° C. | 1280 | 870 | 540 | 386 |
| 2716-17-3 | 7 days at 50° C. | 1660 | 1140 | 700 | 504 |
| 2741-1-2T | 1 | 620 | 420 | 278 | 203 |
| 2741-1-5T | 1 | 620 | 425 | 274 | 203 |
| 2741-1-15T | 1 | 1060 | 715 | 440 | 320 |
| 2741-1-17T | 1 | 1150 | 810 | 524 | 391 |

The result in this example shows that polymeric rheology modifiers of the disclosure have the ability to thicken SME and suspend talc particle (and by extension suspend other solid particles of similar size). The viscosity remained relatively stable after the storage test.

Example 11. Polymeric Rheology Modifiers Suspending Agrochemicals in the Absence of Emulsifiers Various polymeric rheology modifiers of the disclosure were combined with soy methyl ester to make thickened oil formulations containing Tebuconazole pesticide (a triazole fungicide).

TABLE 11

Polymeric Rheology Modifiers Suspension of Agrochemicals

| Thickener 1 | wt % |
|---|---|
| SME | 56.55 |
| 2900-37B | 2.5 |
| Tebuconazole | 40.95 |
| Milling Process | Tebuc/SME homogenized at 12000 rpm for 15 minutes |
| 60 days at room temp | No separation. Smooth |
| 2 weeks at 54° C. | 3.5% top clear. Smooth. No hard pack. |

Viscosity by Malvern Kinexus Ultra rheometer, mPas, 22° C.

| Shear rate, 1/s | 3d RT | 2 wks 54° C. |
|---|---|---|
| 0.168 | 10340 | 10710 |
| 0.285 | 7843 | 8047 |
| 0.484 | 5781 | 6045 |
| 0.825 | 4275 | 4325 |
| 1.404 | 3410 | 3463 |
| 2.391 | 2539 | 2783 |
| 4.07 | 2007 | 2092 |
| 6.928 | 1610 | 1651 |
| 11.79 | 1308 | 1352 |
| 20.07 | 1078 | 1122 |
| 34.15 | 897.6 | 935.8 |
| 58.09 | 758.7 | 793.1 |
| 98.84 | 658.4 | 690.3 |

This example shows that 2.5% polymeric rheology modifier (2900-37B) is able to suspend tebuconazole particles without the presence of emulsifiers. The thickened organic liquid is stable and the viscosity remains relatively unchanged after storage.

The thickened organic liquid composition of the disclosure is also stable after 3 cycles of freeze-thaw (3 F/T). To determine stability after freeze/thaw cycles, the composition was subjected to the appropriate number of freeze/thaw cycles and then visually observed for crystal formation. A composition with no crystal formation after these cycles determined to be stable.

Example 12. Polymeric Rheology Modifiers Suspending Agrochemicals in the Presence and Absence of Emulsifiers Various polymeric rheology modifiers of the disclosure were combined with soy methyl ester to make thickened organic liquid compositions containing Tebuconazole (fungicide), Azoxystrobin (fungicide), or Captan (fungicide). Thickened organic liquid compositions containing emulsifiers were compared to thickened organic liquid compositions without emulsifiers.

TABLE 12A

Agrochemical Thickened Organic Liquid Formulations With and Without Emulsifiers.

| Smpl # | SME wt % | Polymeric rheology modifier (3 wt %) | Pesticide (25 wt %) | Emulsifier* wt % | Sample Process* |
|---|---|---|---|---|---|
| 2716-8-2 | 72 | 2.1 | Azoxystrobin | | 1 |
| 2716-8-4 | 72 | 2.7 | Tebuconazole | | 1 |
| 2716-8-5 | 72 | 2.7 | Azoxystrobin | | 1 |
| 2716-8-6 | 72 | 2.7 | Captan | | 1 |
| 2716-8-8 | 72 | 2.37 | Azoxystrobin | | 1 |
| 2716-8-10 | 72 | 2.26 | Tebuconazole | | 1 |
| 2716-8-11 | 72 | 2.26 | Azoxystrobin | | 1 |
| 2716-8-13 | 72 | 1 | Tebuconazole | | 1 |
| 2716-8-14 | 72 | 1 | Azoxystrobin | | 1 |
| 2716-8-15 | 72 | 1 | Captan | | 1 |
| 2716-8-17 | 67 | 2.7 | Tebuconazole | 5 | 2 |
| 2716-8-20 | 67 | 1 | Tebuconazole | 5 | 2 |
| 2716-14-2 | 67 | 2.28 | Tebuconazole | 5 | 2 |

Emulsifier = Armotan AL6966:Witconate P1220EH:Ethylan NS500LQ (60:20:20)
*Process 1: Homogenized without thickener for 10 minutes before centrifugal mixing with 1 mm beads using a DAC 150.1 FVZ-K machine.
*Process 2: Homogenized pesticide in SME, followed by addition of thickener.

TABLE 12B

Storage Stability and Viscosity of Samples from Table 12A.

| | Initial RT Brookfield DV-I Prime Spindle 5 viscosity, mPas | | | | Appearance at | 14 days RT or 50° C. viscosity, mPas | | | |
|---|---|---|---|---|---|---|---|---|---|
| Lot # | 100 rpm | 50 rpm | 20 rpm | 10 rpm | 50° C. 14 days, or RT 50 days | 100 rpm | 50 rpm | 20 rpm | 10 rpm |
| 2716-8-2 | 1900 | 2326 | 3140 | 3880 | 50° C.: viscous, smooth. | 2136 | 2672 | 3500 | 4320 |
| 2716-8-4 | 528 | 696 | 1040 | 1440 | RT: No separation. Smooth | 556 | 728 | 1080 | 1480 |
| 2716-8-5 | 832 | 1168 | 1900 | 2880 | RT: No separation. Smooth | 788 | 1088 | 1780 | 2640 |
| 2716-8-6 | 376 | 496 | 760 | 1040 | 50° C.: No separation. Smooth | 396 | 528 | 800 | 1120 |
| 2716-8-8 | 696 | 896 | 1300 | 1640 | 50° C.: No separation. Smooth. | 660 | 888 | 1300 | 1840 |
| 2716-8-10 | 740 | 936 | 1300 | 1680 | RT: 2% top clear. Smooth | 772 | 968 | 1340 | 1680 |
| 2716-8-11 | 964 | 1280 | 1880 | 2560 | RT: No separation. Smooth | 1028 | 1344 | 1920 | 2560 |
| 2716-8-13 | 664 | 872 | 1280 | 1800 | RT: No separation. Smooth | 684 | 896 | 1300 | 1800 |
| 2716-8-14 | 752 | 1008 | 1520 | 2080 | RT: No separation. Smooth | 764 | 1016 | 1520 | 2120 |
| 2716-8-15 | 488 | 640 | 980 | 1360 | 50° C.: No separation. Smooth | 496 | 648 | 980 | 1360 |

TABLE 12B-continued

Storage Stability and Viscosity of Samples from Table 12A.

| Lot # | Initial RT Brookfield DV-I Prime Spindle 5 viscosity, mPas | | | | Appearance at 50° C. 14 days, or RT 50 days | 14 days RT or 50° C. viscosity, mPas | | | |
|---|---|---|---|---|---|---|---|---|---|
| | 100 rpm | 50 rpm | 20 rpm | 10 rpm | | 100 rpm | 50 rpm | 20 rpm | 10 rpm |
| 2716-8-17 | 776 | 1024 | 1540 | 2160 | 50° C.: No separation. Smooth. | 872 | 1128 | 1660 | 2280 |
| 2716-8-20 | 916 | 1304 | 1940 | 2520 | 50° C.: No separation. Smooth. | 1000 | 1312 | 1900 | 2640 |
| 2716-14-2 | 766 | 1000 | 1470 | 2080 | 20 days in 50° C. no separation. Top is darker. | | | | |

Viscosity was measured using Brookfield DV-I Prime. At 3% loading the samples in this example were able to suspend the studied pesticide powders.

Example 13. OD Formulation with Polysaccharide Additives

Polymeric rheology modifiers of the disclosure or Attagel 50 (gelling agent) were combined with soy methyl ester to make OD formulations containing Tebuconazole (fungicide) or Imidacloprid (insecticide). Some OD formulations contained Walocel 60K, a MHEC cellulosic polymer.

TABLE 13A

OD formulations with polysaccharide additive

| Smpl # | Liquid phase | Wt % | Thickener 1 wt % | Walocel 60K wt % | Pesticide/ Additive | Wt % | Appearance |
|---|---|---|---|---|---|---|---|
| 2716-11-0 | SME | 75 | 0 | 25 | | | Settled quickly. Fail |
| 2716-11-1 | SME | 72 | 3 | 25 | | | 35 day RT 1% separation. 14 day 40° C. trace separation. No hard pack. |
| 2716-11-3 | SME: soy oil = 50:50 | 72 | 3 | 25 | | | 30 day RT 1% top clear. No hard pack. 3 F/T stable. |
| 2716-11-4 | Surf 262: SME = 6:91 | 75.5 | 2.5 | 22 | | | 14 day at 40° C.~ 2% top clear. 35 day RT 2% top clear. No hard pack. 3 F/T stable. |
| 2716-11-7 | Surf 262: SME = 6:91 | 67.9 | 2.1 | 5 | Imidacloprid | 23.1 | 30 day RT~10% top clear. No hard pack. Hand shaken. 3 F/T stable. |
| 2716-12-5 | SME | 96.67 | | | Attagel 50 | 3.33 | No thickening. Settled quickly. Fail |
| 2716-12-6 | Soy oil | 97.4 | | | Attagel 50 | 2.6 | No thickening. Settled quickly. Fail |
| 2716-13-3 | Surf 262: SME = 6:91 | 69.7 | 2.3 | 5 | Tebuconazole | 23 | 14 days at 40° C. < 2% top clear. |

Surf 262 = 20% Witconate P-1220EH + 60% Armotan Al6966 + 20% Ethylan NS-500LQ

Attagel 50, a common clay thickener used in many OD formulations, did not thicken the SME under the same conditions as the rheology modifier of the present disclosure.

Viscosity measurements of selected samples were made using the process set forth above.

(2900-37B) was able to suspend Walocel 60K in a mixed oil liquid phase (SME:soy Oil=50:50) as shown in sample 2716-11-3. 2900-37B was also able to suspend pesticides (imidacloprid and tebuconazole) and a drift control agent/polysaccharide (Walocel 60K) within the same thickened organic liquid composition.

TABLE 12C

Thickened Organic Liquid Compositions with Polysaccharide (Guar Gum and Xanthan Gum)

| Smpl # | Liquid phase | Wt % | Thickener 2.27 wt % | Drift Control Agent | Wt % | Pesticide | Wt % | Appearance after 18 days at 40° C. |
|---|---|---|---|---|---|---|---|---|
| 2716-15-1 | Surf 262:SME (6:91) | 75.4 | 2.6 | AGRHO DR-2000 | 22 | | | Trace Top Clear |
| 2716-15-2 | Surf 262:SME (6:91) | 75.4 | 2.6 | Kelzan S xanthan gum | 22 | | | Trace Top Clear |
| 2716-15-3 | Surf 262:SME (6:91) | 69.6 | 2.4 | AGRHO DR-2000 | 5 | Tebuconazole | 23 | 4% Top Clear. Good |
| 2716-15-4 | Surf 262:SME (6:91) | 69.6 | 2.4 | AGRHO DR-2000 | 5 | Imidacloprid | 22 | Trace Top Clear |
| 2716-15-5 | Surf 262:SME (6:91) | 81 | 3 | Walocel 60K | 16 | | | 4% Top Clear. Good |

Surf 262 = 20% Witconate P-1220EH + 60% Armotan A16966 + 20% Ethylan NS-500LQ Brookfield DV-II + Pro Spindle 64 viscosity of 2716-15-5:
10 rpm 1500 mPas
20 rpm 1020 mPas
50 rpm 732 mPas
100 rpm 558 mPas

TABLE 13B

Brookfield (DV-II+ Pro) Viscosity data for samples from Table 13A.

| Sample Lot # | SPDL # | RPM | Viscosity | Days at RT after preparation |
|---|---|---|---|---|
| 2716-11-3 | 62 | 5 | 9000 | 35 |
| | 62 | 10 | 7800 | |
| | 62 | 20 | 6269 | |
| | 62 | 50 | 4100 | |
| | 62 | 100 | 3071 | |
| 2716-11-4 | 64 | 10 | 3539 | 35 |
| | 64 | 20 | 2669 | |
| | 64 | 50 | 1824 | |
| | 64 | 100 | 1356 | |
| 2716-11-7 | 62 | 5 | 1700 | 32 |
| | 62 | 10 | 1296 | |
| | 62 | 20 | 997 | |
| | 64 | 50 | 720 | |
| | 64 | 100 | 600 | |

This Table 13B shows that the polysaccharide Walocel 60K cellulosic drift control agent settled in SME and soil quickly in the absence of the polymeric rheology modifiers of the disclosure. The suspension aid Attagel 50, known in the art, does not have thickening ability in SME or soy oil (sample 2716-12-5 and 2716-12-6). Polymeric rheology modifier 2900-37B showed the ability to suspend Walocel 60K in SME with and without the presence of emulsifier Surf 262 (sample 2716-11-1 and 2716-11-4). Thickener 1

The samples were prepared by initially mixing the powders and then adding the powder mixture to the liquid phase. The mixing was carried out by an overhead mixer.

Example 14. Azoxystrobin (25%) with SME, Rheology Modifiers (35:65 IBXMA:IBMA) of the Disclosure, and Emulsifiers

TABLE 14A

Thickened Organic Liquid Composition with Azoxystrobin

| 2761-8 | wt % |
|---|---|
| SME | 67.5 |
| Azoxystrobin | 25 |
| Surf 8:2 | 5 |
| Thickener* | 3 |

Surf 8:2 = 80% (60:20:20 = Witconate P-1220EH:Armotan AL 69-66:Ethylan NS-500LQ) and 20% ACAR 16028
*Thickener identified below in Table 14B The thickened oil composition was prepared by bead milling azoxystrobin together with SME and Surf 8:2 using a Eiger Mini Motormill M100, Model #: MK11 M100 VSE TVF DI at 4500 rpm with 1-1.6 mm zirconium silica beads for 15 minutes with 10° C. cooling water to cool the milling chamber and to obtain a slurry. The thickener (identified below in Table 14B) was added to the bead-milled slurry and homogenized at ~12000 rpm for several minutes.

The slurry without the thickener was unstable and showed >10% separation overnight at room temperature.

TABLE 14B

Viscosity and stability of the thickened organic liquid of Table 14A

| | | Initial Thickened organic liquid sample # | | | | | | |
|---|---|---|---|---|---|---|---|---|
| | Slurry | 2761-8-1 | 2761-8-2 | 2761-8-3 | 2761-8-4 | 2761-8-5 | 2761-8-10 | 2761-8-15 |
| | | | | Thickener used | | | | |
| rpm | None | 2.8 | 2.10 | 2.11 | 2.12 | 2.21 | 2.30 | 2.29 |
| | | Brookfield DV-II + Pro Spindle 64 Viscosity, mPas | | | | | | |
| 0.5 rpm | | 27594 | 31193 | 34793 | 41991 | 32393 | 48230 | 51100 |
| 1 | | 19196 | 23995 | 21595 | 23995 | 18596 | | |
| 2 | | 15897 | 17096 | 17096 | 18896 | 15897 | | |
| 2.5 | | 12717 | 13677 | 13437 | 14637 | 12957 | | |
| 4 | | 8098 | 8398 | 7948 | 9148 | 8398 | | |
| 5 | | 6599 | 6839 | 6359 | 7198 | 6839 | 8542 | 9214 |
| 10 | 1329 | 5399 | 4859 | 5219 | 5219 | 5219 | 5543 | 5844.5 |
| 20 | 765 | 3749 | 3599 | 3479 | 4049 | 3599 | 3554.5 | 3800 |
| 50 | 385 | 2172 | 1980 | 1848 | 2328 | 1980 | 2145.5 | 2254.5 |
| 100 | 243 | 1578 | 1368 | 1380 | 1710 | 1416 | 1590 | 1632 |
| Days at 54° C. | | 21 | 21 | 21 | 21 | 21 | 14 | 14 |
| 10 rpm | | 6239 | 6419 | 5399 | 6599 | 5459 | 4859 | 4799 |
| 20 | | 4319 | 4469 | 3659 | 4799 | 3869 | 3239 | 3239 |
| 50 | | 2675 | 2747 | 2244 | 3203 | 2423 | 2100 | 2064 |
| 100 | | 2058 | 2046 | 1644 | 2441 | 1800 | 1530 | 1482 |
| Appearance | | No separation | No separation | No separation | No separation | No separation | No separation | No separation |

This example illustrates that the rheology modifiers of the disclosure were able to suspend azoxystrobin powder without any separation at 54° C. for 2-3 weeks.

Example 15. Azoxystrobin (25%) with SME, Rheology Modifiers (9.4:24.6:66 Styrene:IBXMA:IBMA) of the Disclosure, and Emulsifiers

TABLE 15A

| Thickened Oil Composition with Azoxystrobin | |
|---|---|
| 2761-8 | wt % |
| SME | 67.5 |
| Azoxystrobin | 25 |
| Surf 8:2 | 5 |
| Thickener* | 3 |

*Thickener identified below in Table 15B

The thickened organic liquid compositions of Example 15 were prepared using the same method described in Example 15, except the rheology modifiers were different as detailed further below in Table 15B.

TABLE 15B

Viscosity and stability of the thickened oil compositions of Table 14A

| | Initial Thickened Organic Liquid Composition sample # | | | | | | |
|---|---|---|---|---|---|---|---|
| | 2761.8.6 | 2761.8.7 | 2761.8.8 | 2761.8.9 | 2761.8.11 | 2761-8-12 | 2761-8-13 | 2761-8-14 |
| | | | | Thickener used | | | | |
| | 2.49 | 2.53 | 2.54 | 2.55 | 2.52 | 2.56 | 2.47 | 2.51 |
| rpm | Brookfield DV-II + Pro Spindle 64, Viscosity, mPas | | | | | | | |
| 0.5 | 22795 | 30473 | 32633 | 23035 | 38872 | 46790 | 42471 | 27594 |
| 1 | 18836 | 19076 | 22555 | 15717 | | | | |
| 2 | 12237 | 12837 | 13977 | 9778 | | | | |

TABLE 15B-continued

Viscosity and stability of the thickened oil compositions of Table 14A

| 2.5 | 10414 | 10990 | | | | | | |
|---|---|---|---|---|---|---|---|---|
| 4 | 7348 | 7858 | | | | | | |
| 5 | 6287 | 6599 | 6959 | 4823 | 8662 | 9286 | 8086 | 4391 |
| 10 | 4175 | 4355 | 4439 | 3107 | 5927 | 6005 | 5055.5 | 2831 |
| 20 | 2729 | 2795 | 2891 | 2604 | 4034.5 | 4104.5 | 3273.5 | 1656 |
| 50 | 1574 | 1641 | 1675 | 1133 | 2539.5 | 2465.5 | 1940 | 1032 |
| 100 | 1131 | 1116 | 1175 | 748 | 1908 | 1860 | 1464 | 770 |

2 weeks at 54° C.

| 10 rpm | 3239 | 3239 | 3659 | 2040 | 4799 | 4979 | 3599 | 2040 |
|---|---|---|---|---|---|---|---|---|
| 20 | 1950 | 2220 | 2459 | 1530 | 3779 | 3539 | 2369 | 1800 |
| 50 | 1320 | 1440 | 1452 | 911.8 | 2292 | 2232 | 1632 | 1032 |
| 100 | 1026 | 1014 | 1032 | 623.9 | 1770 | 1698 | 1284 | 611.9 |
| % top clear | 3.2 | 1.6 | Trace | 11.3 | 3.2 | 3.2 | 1.6 | 12.9 |

This example 15 showed that the rheology modifiers of the disclosure were able to suspend azoxystrobin powder adequately at 54° C. for 2 weeks. It was noticed that the sample (100 g in 4 oz jar with a sample height~62 mm) was more viscous at the bottom and the amount that did not flow after inverting the samples upside down was proportional to the top clear amount. However, the samples were able to return to homogenous after gentle shaking.

Example 16. Additional Thickened Organic Liquid Composition Samples with Polymeric Rheology Modifiers 1 and 2.25

TABLE 16

Composition and stability of additional thickened oil compositions

| Lot# | 2716-1-21 | 2716-3-7 | 2716-3-8 | 2716-3-14 | 2716-3-15 |
|---|---|---|---|---|---|
| SME | 59.5 | 63.7 | 69.16 | | |
| 42% tebuconazole in SME-bead milled | | | | 71.44 | 61.33 |
| Surf 271 | 8.4 | | | | |
| Surf 262 | | 4.2 | 4.56 | | |
| Soy oil | | | | 25.56 | 35.57 |
| Thickener 2.25 | 2.1 | | | | |
| Thickener 1 | | 2.1 | 2.28 | 3 | 3.1 |
| Atrazine | 30 | | 24 | | |
| Imidacloprid | | 30 | | | |
| Comment | 60 d RT 7% top clr. 14 d 54 C. 2% top clr. No hard pack. | 14 days 54 C. 3% top clr. | 14 d 54 C. 2% top clr. 60 d RT trace separation. | 14 d 54 C. no separation. | 14 d 54 C. no separ. 30 d RT no separation. |

Surf 262 = 2:6:2 Witconate P1220EH:Armotan Al6966:Ethylan NS500LQ
Surf 271 = 2:7:1 Witconate P1220EH:Armotan Al6966:Ethylan NS500LQ This Example 15 illustrates that the thickened compounds of the disclosure can suspend various solid agrochemicals.

Example 17. Suspension of Copper Oxychloride in SME

TABLE 17

Composition and stability of additional thickened oil compositions

| | 2716-14-6 wt % | 2716-14-8 wt % |
|---|---|---|
| SME | 66.3 | 55.6 |
| Copper oxychloride | 30.6 | 40.9 |

TABLE 17-continued

Composition and stability of additional thickened oil compositions

| | 2716-14-6 wt % | 2716-14-8 wt % |
|---|---|---|
| Thickener 2.28 | 3.1 | 3.5 |
| Process | Hand shaken | Hand shaken |
| Comment | ~8% top clear after 14 days at 50 C. | No separation 8 days at RT |

This Example 17 illustrates that the thickened compounds of the disclosure can suspend copper oxychloride.

Example 18. Nicosulfuron herbicide OD Formulations

TABLE 18

Composition and stability of additional thickened organic liquid compositions

| | 2742-3A wt % | 2742-3B wt % | 2742-3C wt % | 2742-3D wt % |
|---|---|---|---|---|
| SME | 86 | 86 | 86 | 86 |
| Nicosulfuron | 5 | 5 | 5 | 5 |
| Surf 8:2 | 6 | 6 | 6 | 6 |
| Thickener 2.27 | 3 | | | |
| Thickener 2.8 | | 3 | 3 | |
| Thickener 2.9 | | | | 3 |

| Initial | Brookfield DV-I Prime Spindle 4, viscosity, mPas | | | |
|---|---|---|---|---|
| 5 rpm | 840 | 920 | 940 | 840 |
| 10 rpm | 600 | 660 | 670 | 620 |
| 20 rpm | 435 | 485 | 485 | 455 |
| 50 rpm | 295 | 330 | 330 | 310 |
| 100 rpm | 225 | 255 | 250 | 240 |

| 2 wks at 50 C. | No top clear, no sediment | No top clear, no sediment | No top clear, no sediment | No top clear, no sediment |
|---|---|---|---|---|
| 5 rpm | 1240 | 1360 | 1200 | 1360 |
| 10 rpm | 820 | 900 | 840 | 880 |
| 20 rpm | 565 | 630 | 570 | 590 |
| 50 rpm | 370 | 420 | 380 | 400 |
| 100 rpm | 280 | 320 | 290 | 300 |

Surf 8:2 = 80% Surf 622 (Witconate P-1220EH:Armotan AL 69-99:Ethylan NS-500LQ): 20% ACAR 16028.
The samples were milled with a machine (Eiger Torrance Limited-Mini Moto 250) using a glass, borosilicate beads at a size of 1 mm in diameter.
Milling time was 15-30 minutes and milling speed was 3500-4500 rpm.

Example 19. Performance of Additional Samples

TABLE 19

Composition and stability of additional thickened organic liquid compositions

| Component | 9-30-16-2 % w/w | 9-30-16-7 % w/w | 9-30-16-8 % w/w |
|---|---|---|---|
| Azoxystrobin | 25 | | 25 |
| SME | 67 | 57 | 67 |
| Thickener 2.9 | 3 | 3 | |
| Surf 55:05:40 | 5 | 5 | 5 |
| Tebuconazole | | 35 | |
| Thickener 2.48 | | | 3 |
| 2 weeks at 54 C. | No separation | No separation | Trace top clear |

| | Brookfield DV-II+ Pro Viscometer Spindle 64 after 2 weeks at 54 C., | | |
|---|---|---|---|
| rpm | Visc (cp) | Visc (cp) | Visc (cp) |
| 100 | 1572 | 1560 | 1344 |
| 50 | 2028 | 1956 | 1704 |
| 20 | 3089 | 1879 | 2609 |
| 10 | 4799 | 4079 | 3959 |

Surf 55:05:40 = Witconate P-1220EH:Emulpon CO-360:Ethylan NS-500LQ.(55:5:45)

Example 20. Pesticide ODs

TABLE 20

Composition, viscosity data, and storage stability

| | 2761-43-1 wt % | 2761-43-2 wt % | 2761-43-4 wt % |
|---|---|---|---|
| Azoxystrobin | 25 | 25 | 0 |
| Tebuconazole | 0 | 0 | 35 |
| SME (Cargill) | 67 | 67 | 57 |
| Thickener 2.57 | 3 | 0 | 0 |
| Thickener 2.58 | 0 | 3 | 3 |
| Surf (55:40:5) | 5 | 5 | 0 |
| Surf (30:30:40) | 0 | 0 | 5 |

| Initial samples | Brookfield DV-II+ Pro Spindle 64 viscometer | | |
|---|---|---|---|
| rpm | Visc, mPas | Visc, mPas | Visc, mPas |
| 100 | 1164 | 1260 | 1722 |
| 50 | 1728 | 1860 | 2459 |
| 20 | 3029 | 3449 | 3899 |
| 10 | 5159 | 5579 | 6599 |
| 5 | 7678 | 8278 | 10798 |

| After 2 weeks at 54 C. rpm | Visc, mPas | Visc, mPas | Visc, mPas |
|---|---|---|---|
| 100 | 1518 | 1638 | 2256 |
| 50 | 2040 | 2148 | 3215 |
| 20 | 3179 | 3539 | 4949 |
| 10 | 4979 | 5159 | 7358 |
| 5 | 7438 | 7558 | 9238 |
| Separation | 5% | no sep | no sep |

Surf (55:40:5) = Witconate P-1220EH:Emulpon 00-360:Ethylan NS-500LQ (55:40:5)
Surf (30:30:40) = Witconate P-1220EH:Emulpon 00-360:Ethylan NS-500LQ (30:30:40)

Example 21. Polymeric Rheology Modifier Thickening and Suspending Performance in Aromatic Solvents The viscosity of exemplary polymeric rheology modifiers in aromatic solvent was measured. Aromatic 200 Fluid from Exxon Mobil was used as the solvent to create formulations containing Azoxystrobin (fungicide) and Mancozeb (fungicide). Aromatic 200 is a heavy aromatic naptha (petroleum) solvent having a flash point of about 200° F., and a viscosity of less than 5 mPas at room temperature. Increased viscosity is indicative of thickening ability of the rheology modifier being analysed.

The thickened solvent composition was prepared by bead milling azoxystrobin together with Aromatic 200 and Surf 55:40:5 using an Eiger Mini Motormill M100, Model #: MK11 M100 VSE TVF DI at 4500 rpm with 1-1.6 mm zirconium silica beads for 15 minutes with 10° C. cooling water to cool the milling chamber and to obtain a slurry. The thickener was added to the bead-milled slurry and homogenized at ~12000 rpm for several minutes.

TABLE 21

Viscosities of Pesticide Formulations Using Aromatic Solvent

| | 11-8-16-1 | 11-8-16-2 | 11-8-16-3 | 11-8-16-4 |
|---|---|---|---|---|
| Aromatic 200 | 67 | 67 | 57 | 57 |
| Azoxystrobin fungicide | 25 | 25 | | |

TABLE 21-continued

Viscosities of Pesticide Formulations Using Aromatic Solvent

| | | | | |
|---|---|---|---|---|
| Mancozeb fungicide | | | 35 | 35 |
| Surf 55:40:5 | 5 | 5 | 5 | 5 |
| Thickener 2.9 | 3 | | 3 | |
| Thickener 2.48 | | 3 | | 3 |

Brookfield DV-II+ Pro Viscometer, spindle 63, Initial viscosity 22° C.

| RPM | Visc, mPas | Visc, mPas | Visc, mPas | Visc, mPas |
|---|---|---|---|---|
| 100 | 1050 | 1170 | | 1169 |
| 50 | 1510 | 1620 | | 1650 |
| 20 | 2600 | 2650 | 4200 | 2600 |
| 10 | 4100 | 4000 | 6191 | 3800 |
| 5 | 6500 | 6100 | 9470 | 5495 |
| 2 | 13000 | 11700 | 18000 | 9900 |
| 1 | 20630 | 18600 | 29300 | 15600 |
| 0.5 | 35272 | 32390 | 51353 | 25914 |
| After 3 weeks at 54 C. | | | | |
| 10 | 4163 | 4151 | 6323 | |

Surf 55:40:5 = Witconate P-1220EH:Emulpon 00360:Ethylan NS500LQ (55:40:5)

Without the thickeners, mancozeb and azoxystrobin in this example settled to bottom overnight.

With 3% thickener, all four samples in this example were stable (no lump, no cream, and no sediment) after 3 weeks at 54° C. As shown with the viscosity data, the samples showed strong shear thinning property. High shear thinning property is an advantageous property and is believed to be associated with the ability of the polymeric rheology modifier to suspend solids. As rheology modifiers, 2907-34A and 2907-34B works well in aromatic solvents. The amount of thickener may be reduced and still exhibit thickening and suspending properties.

Aromatic solvents have traditionally been used in agro formulations due to their low cost. For this reason, mixtures of aromatic solvents with other more expensive mediums such as oils would be preferred.

Example 22 Polymeric Rheology Modifiers Stabilizing Solid Agrochemicals in Aromatic Solvent Formulations The ability of aromatic solvent formulations containing polymeric rheology modifiers of the disclosure to suspend powder was analysed. Aromatic 150 Fluid from Exxon Mobil was used as the solvent to create OD formulations containing Mancozeb (fungicide). Aromatic 150 is a heavy aromatic naptha (petroleum) solvent having a flash point of about 150° F., and a viscosity of less than 5 mPas at room temperature.

Top clear means the top portion of the composition containing no solid particle as visually observed and as measured in relation to the total composition height.

TABLE 22

Thickened Solvent Compositions Stabilizing Mancozeb Fungicide

| | Wt % |
|---|---|
| Aromatic 150 solvent | 46.43 |
| Mancozeb fungicide | 48.98 |
| Surf 55:5:40 emulsifier | 3.06 |
| Thickener 2.9 | 1.53 |

TABLE 22-continued

Thickened Solvent Compositions Stabilizing Mancozeb Fungicide

| RPM, spindle 64 | Brookfield DV-II+ Visc. (mPas) 22° C. |
|---|---|
| 100 | 1524 |
| 50 | 1884 |
| 20 | 2609 |
| 10 | 3719 |
| 5 | 4559 |
| 2 | 9598 |
| 1 | 14397 |

Surf 55:5:40 = Witconate P-1220EH:Emuloon 00360:Ethylan NS500LQ (55:5:40).

The thickener dissolved in Aromatic 150 easily without heating. After the thickener was dissolved, the emulsifier blend and Mancozeb powder was added. The sample was homogenized at 12000 rpm for 10 minutes.

This Mancozeb OD formulation was stable (<1% top clear, no lumps and no sediment of the Mancozeb particles) after 14 days at 54° C. The sample flowed easily. Without the thickener, Mancozeb in Aromatic 150 settled to bottom after several hours.

Example 23. Imidacloprid OD and Atrazine OD Thickened by Thickener 2.63

The thickened organic liquid composition (ODs) was prepared by bead milling the active ingredient together with the organic liquid (Aromatic 200 or SME) and Surf 55; 40:5 using a Eiger Mini Motormill M100, Model #: MK11 M100 VSE TVF DI at 4500 rpm with 1-1.6 mm zirconium silica beads for 15 minutes with 10° C. cooling water to cool the milling chamber and to obtain a slurry. The thickener 2907-82 was added to the bead-milled slurry and homogenized at ~8000 rpm for several minutes. Viscosity was measured before and after 54° C. storage test. The stability after 54° C. storage test was observed. The results are shown in Table 23.

TABLE 23

Compositions and results of imidacloprid OD and atrazine OD thickened by thickener 2.63

| | 2780-14-6 | 2780-14-7 | 2780-14-9 |
|---|---|---|---|
| Imidacloprid | 25 | 25 | |
| Atrazine | | | 20 |
| Thickener 2.63 | 3 | 3 | 2.4 |
| SME | 64 | | |
| Aromatic 200 | | 67 | 73.6 |
| Surf 55:40:5 | 3.9 | 5 | 4 |

| Brookfield DVII+ Spindle setting 64 | Initial Viscosity, mPas | | |
|---|---|---|---|
| 100 rpm | 858 | 1224 | 1308 |
| 50 rpm | 1080 | 1740 | 2112 |
| 20 rpm | 1620 | 2939 | 3749 |
| 10 rpm | 2280 | 4499 | 6119 |
| 5 rpm | 3119 | 6959 | 10558 |
| 2 weeks @ 54° C. | 100% stable | 100% stable | 100% stable |
| 100 rpm | 708 | 1350 | 1038 |
| 50 rpm | 900 | 1872 | 1584 |
| 20 rpm | 1410 | 3119 | 2909 |
| 10 rpm | 2220 | 4919 | 4799 |
| 5 rpm | 2999 | 7198 | 7558 |

Surf 55:40:5 = Witconate P-1220EH:Emulpon C0360:Ethylan NS500LQ (55:40:5)

Example 24. Pesticide ODs in Vegetable Oil Stabilized by Thickener 2.63

Same preparation process was used as in example 23.

TABLE 24

Composition and results of pesticide ODs in vegetable oil stabilized by thickener 2907-82

|  | 2780-20-2 wt % | 2780-20-5 wt % | 2780-20-4 wt % |
|---|---|---|---|
| Azoxystrobin | 23.04 | X | X |
| Atrazine | X | 18.37 | X |
| Imidacloprid | X | X | 25 |
| Thickener 2.63 | 2.26 | 2.29 | 2.5 |
| Surf 55:40:5 | 5.57 | 4.59 | 5 |
| Soya oil | 69.13 | 74.76 | 67.5 |

TABLE 24-continued

Composition and results of pesticide ODs in vegetable oil stabilized by thickener 2907-82

| Brookfield DVII+ Spindle setting 64 Rpm | Visc, mPas | Visc, mPas | Visc, mPas |
|---|---|---|---|
| 100 | 1548 | 1626 | 935.8 |
| 50 | 1884 | 2459 | 1200 |
| 20 | 2669 | 4439 | 1680 |
| 10 | 4199 | 7328 | 2399 |
| 5 | 5519 | 10558 | 3599 |
| 2 weeks at 54° C. | No separation | No separation | No separation |

Surf 55:40:5 = Witconate P-1220EH:Emuloon 00360:Ethylan NS500LQ (55:40:5)

Example 25. Pesticide suspensions in C4EO1, 2-EH acid, 2-EH alcohol, methyl benezoate, tributyl citrate, and Armid DM-810

The samples were prepared by homogenizing components without the thickener first at 12000 rpm/5 minutes. The thickener was added to the homogenized samples and shaken with hands every 10 minutes for ~1 hour and shaken again next day.

TABLE 25

Composition and results of pesticide suspensions in C4EO1, 2-EH acid, 2-EH alcohol, methyl benezoate, tributyl citrate, Berol 840, Armid DM-810

|  | 2780-46-1 | 2780-46-3 | 2780-46-6A | 2780-46-7 | 2780-46-8 | 2780-46-12 | 11-16-2017 |
|---|---|---|---|---|---|---|---|
| Nicosulfuron | 5.00 | 5.00 |  |  |  |  |  |
| Glyphosate acid |  |  | 40.00 |  | 30.00 |  |  |
| Azoxystrobin |  |  |  | 40.00 |  |  |  |
| Captan |  |  |  |  |  | 40.00 |  |
| Clothianidin |  |  |  |  |  |  | 33.77 |
| Thickener 2.63 | 3.00 | 3.00 | 3.00 | 3.00 | 3.00 | 3.00 | 2.11 |
| 2-EH alcohol | 92.00 |  | 77.00 |  |  |  |  |
| Methyl Benzoate |  | 92.00 |  |  |  |  |  |
| Butanol-1EO |  |  |  |  |  | 57.00 |  |
| Tributyl citrate |  |  |  | 57.00 |  |  |  |
| Armid DM-810 |  |  |  |  | 67.00 |  |  |
| 2-EH acid |  |  |  |  |  |  | 64.12 |
| Brookfiled DV-II + | | | | Room temp viscosity | | | |
| Spindle setting | 31 | 21 | 63 | 63 | 63 | 63 | 64 |
| RPM 1 | 9208 | 1644 |  |  |  |  |  |
| RPM 2 | 5744 | 1029 |  |  | 12597 |  |  |
| RPM 5 | 3023 | 534 | 9500 | 5100 | 7000 |  |  |
| RPM 10 | 1930 | 345 | 6000 | 3890 | 4100 |  | 2350 |
| RPM 20 | 1243 | 226 | 3920 | 2950 | 2717 |  | 1640 |
| RPM 50 |  |  | 2400 | 2165 | 1600 |  | 1060 |
| RPM 100 |  |  |  |  | 1100 |  | 780 |
| 2 weeks at 54° C. | No separ. | No separ. | No separ. | No separ. | No separ. | No separ. | No separ. |
| RPM 1 | 2759 | 1500 |  |  |  |  |  |
| RPM 2 | 1710 | 928 |  |  | 15177 |  |  |
| RPM 5 | 1002 | 495 |  | 5015 | 7400 | 5200 |  |
| RPM 10 | 675 | 314 | 8146 | 3743 | 4727 | 3431 | 2699 |
| RPM 20 | 481 | 204 |  | 2873 | 3089 | 2340 | 1920 |
| RPM 50 | 314 |  |  | 2145 | 1850 | 1387 | 1272 |
| RPM 100 | 238 |  |  |  |  | 975 | 950 |

Example 27. ODs of Glyphosate Acid and 2,4D Acid, and Multi-Actives ODs

The following thickened organic liquid compositions were homogenized without the thickener first at 12000 rpm for 5 minutes. The thickener 2.63 was added to the homogenized slurry and mixed until dissolved.

TABLE 27

Viscosity and stability data of herbicide ODs

|  | 2780-23-1 wt % | 2780-23-5 wt % | 7-21-17-10 wt % |
|---|---|---|---|
| 2,4-D ester | 20 | 20 |  |
| 2,4-D acid | 40 |  | 50.94 |
| Glyphosate acid |  | 40 |  |
| SME | 31 | 31 | 43.3 |
| Thickener 2.63 | 3 | 3 | 1.4 |
| Surf 51:19:30 | 6 | 6 |  |
| Surf 8:2 |  |  | 4.36 |

| Brookfiedl DV-II+ viscosity | Initial | 2 weeks 54 C. | 2 weeks 54 C. |  |
|---|---|---|---|---|
| SPDL | 4 (64) | 4 (64) | 4 (64) | 34 |
| rpm | Visc, mPas | Visc, mPas | Visc, mPas | Visc, mPas |
| 100 | 2016 | 1908 | 2004 |  |
| 50 | 2615 | 2507 | 2783 | 1073 |
| 20 | 3899 | 3479 | 4769 | 1368 |
| 10 | 5879 | 4859 | 7019 | 1854 |
| 5 | 8158 | 6719 | 9958 | 2423 |
| Stability | No separation | No separation | No separation | No separation |

Example 28. Decreased Evaporation of d-Limonene

D-limonene has been used as a herbicide (Avenger® Weed Killer Concentrate Herbicide). The evaporation rate of a d-limonene sample with no polymeric rheology modifier was compared to a d-limonene sample containing a polymeric rheology modifier of the current disclosure.

TABLE 28

Evaporation study of d-limonene

|  | Name of C1 | wt of C1 | Name of C2 | wt of C2 | Total Wt Loss % |
|---|---|---|---|---|---|
| Experiment 1 | D-Limonene | 9.0 g |  |  | 77.9% |
| Experiment 2 | D-Limonene | 9.0 g | Thickener 2.63 | 1.0 g | 43.8% |

A slowly evaporating d-limonene would last longer on leaf, favoring higher herbicidal effect.

This result has potential use in various industries. Since essential oils can also be thickened by the thickeners of the present disclosure, air fresheners comprising thickened essential oils would last longer.

Example 29. Temperature and Surfactant Effect on Thickening of Thickener 2907-82

TABLE 29

Brookfield viscosity of 5% 2907-82 in SME with or without the presence of surfactant

| Brookfield Dy-II prime | 2815-25-1 (95% SEM + 5% 2907-82) | | 2815-25-2 (87% SME + 5% 2907-82 + 8% Surf 55:40:5) |
|---|---|---|---|
| Spindle 3 | RT (24° C.) | 50° C. | RT (24° C.) |
| 0.5 rpm | 14400 | 13000 | 10800 |
| 1 | 9100 | 8900 | 6900 |
| 2 | 5700 | 5450 | 4400 |
| 2.5 | 4960 | 4720 | 3800 |
| 4 | 3650 | 3400 | 2800 |
| 5 | 2480 | 2920 | 2360 |
| 10 | 2000 | 1520 | 1530 |
| 20 | 1340 | 1190 | 1030 |
| 50 | 736 | 652 | 638 |
| 100 | 471 | 388 | 465 |

It can be seen that the thickening ability of thickener 2.63 is not affected significantly as temperature is changed or surfactant is added.

Example 30. Molecular Weight of Polymeric Rheology Modifiers of the Disclosure Molecular weight was determined by Hydrodynamic Chromatography with multiangle light scattering detection (MALS). This method is similar to a standard GPC/MALS, except a smaller pore size column is used compared to standard GPC/MALS, which results in all the separation taking place in the interstitial volume of the GPC column.

Samples were prepared by dissolving about 10 mg of sample in about 10 ml of butylated hydroxytoluene (BHT) stabilized tetrahyrofuran (THF). Some samples were further diluted 10-fold with THF as necessary.
Column: PL-Gel 100A 5 um 30 cm×7.8 mm
Column Temp: 40° C.
Solvent: tetrahydrofuran with 0.1% BHT preservative
Injection: 50 µl or 25 µl
Detection: Wyatt Dawn Heleos 18 angle MALS 633 nm and Wyatt Optilab T-Rex Refractive index detector

TABLE 30

Molecular weight values of polymeric rheology modifiers of the invention

| Sample | Reference | Mw × $10^6$ (D) |
|---|---|---|
| 1 | 2900-37B | 272.0 |
| 2.1 | 2607-071 | 81.8 |
| 2.2 | 2607-070 | 242.0 |
| 2.3 | 2607-068 | 230.0 |
| 2.4 | 2607-066 | 339.0 |
| 2.7 | 2728-004 | 245.0 |
| 2.25 | 2607-073 | 176.0 |
| 2.26 | 2728-007 | 189.9 |
| 2.27 | 2728-009 | 450.0 |
| 2.28 | 2728-013 | 318.0 |
| 2.37 | 2728-006 | 273.0 |
| 2.65 | 2728-12 | 85.2 |
| 2.70 | 2607-067 | 17.4 |
| 2.73 | 2607-072 | 2.5 |
| 2.74 | 2900-35A | 397.0 |

The foregoing examples are presented by way of illustration and not by way of limitation. Those skilled in the art will understand other examples and embodiments are encompassed within the present disclosure. The spirit and scope of the present invention are to be limited only by the terms of any claims presented hereunder.

What is claimed is:

1. A thickened organic liquid comprising an organic liquid and a polymeric rheology modifier, wherein the organic liquid is includes less than 10 wt % of gasoline and diesel fuel based on a total weight of the organic liquid, and wherein the polymeric rheology modifier is obtained by co-polymerizing a monomer mixture comprising:
   10 to 80 wt % of at least one alkyl (meth)acrylate; and at least one of the following monomers:
   5 to 70 wt % a bicyclic (meth)acrylate ester different from the alkyl (meth)acrylate, and/or
   10 to 40 wt % of an aromatic vinyl monomer
   up to a total of 100 wt %, wherein the weight percentages of the monomer are based on the total weight of all the monomers.

2. The thickened organic liquid composition of claim 1 wherein the monomer mixture comprises:
   25 to 60 wt % of the bicyclic (meth)acrylate ester, and
   40 to 75 wt % of the alkyl (meth)acrylate,
   up to a total of 100 wt %, wherein the weight percentages of the monomer are based on the total weight of all the monomers.

3. The thickened organic liquid composition of claim 1 wherein the monomer mixture comprises:
   5 to 50 wt % of the bicyclic (meth)acrylate ester,
   25 to 70 wt % of the alkyl (meth)acrylate, and
   10 to 40 wt % of the aromatic vinyl monomer,
   up to a total of 100 wt %, wherein the weight percentages of the monomer are based on the total weight of all the monomers.

4. The thickened organic liquid composition of claim 1 wherein the alkyl (meth)acrylate is chosen from the group consisting of lower alkyl (meth)acrylate, fatty alkyl (meth)acrylate, and combinations thereof, and wherein the monomer mixture comprises:
   10 to 30 wt % of the bicyclic (meth)acrylate ester,
   10 to 25 wt % of a lower alkyl (meth)acrylate having a (meth)acryloyl radical bonded to a C1-C6 alkyl group which is linear or branched, substituted or unsubstituted, and saturated or unsaturated,
   30 to 40 wt % of a fatty-alkyl (meth)acrylate having a (meth)acryloyl radical bonded to a C8-C24 alkyl group which is linear or branched, substituted or unsubstituted, and saturated or unsaturated, and
   15 to 30 wt % of the aromatic vinyl monomer,
   up to a total of 100 wt %, wherein the weight percentages of the monomer are based on the total weight of all the monomers.

5. The thickened organic liquid composition of claim 1 wherein the bicyclic (meth)acrylate ester is isobornyl methacrylate, the lower alkyl (meth)acrylate is isobutyl methacrylate, the fatty-alkyl (meth)acrylate is lauryl methacrylate and the aromatic vinyl monomer is styrene.

6. The thickened organic liquid composition of claim 1 wherein the organic liquid is selected from the group consisting of esters, fatty acids, aromatic compounds, glycerides, essential oils, turpentines, ethers, alcohols, alcohol alkoxylates, cyclic terpenes, chlorine substituted hydrocarbons, liquid pesticides, amines, heterocyclic compounds, silicone oils with aromatic groups, ketones, alkyl dimethyl amides, alkylnitriles, alkylene glycols, trialkyl phosphates, and combinations thereof.

7. The thickened organic liquid composition of claim 1 wherein the viscosity of the thickened organic liquid composition is at least 150 mPas, measured by a Brookfield viscometer at 10 rpm at 22C.

8. The thickened organic liquid composition of claim 1 wherein the concentration of the polymeric rheology modifier in the organic liquid is less than 10 wt.

9. The thickened organic liquid composition of claim 1 wherein the polymeric rheology modifier further comprises a cross-linking monomer in the amount of between 20 mg/kg and 2000 mg/kg.

10. The thickened organic liquid composition of claim 1 further comprising solid particles wherein the solid particles are suspended in the organic liquid, and wherein the solid particles have an average size less than 200 microns.

11. The thickened organic liquid composition of claim 1 wherein the solid particles are pesticides.

12. The thickened organic liquid composition of claim 1 further comprising an emulsifier selected from the group consisting of anionic surfactants, nonionic surfactant, nonionic block copolymers, nitrogen containing alkoxylated derivatives and combinations thereof.

13. The thickened organic liquid composition of claim 1 wherein the polymeric rheology modifier has an average particle size of less than 60 mesh size.

14. The thickened oil composition of claim 1 wherein the polymeric rheology modifier is made with an emulsion polymerization process.

15. The thickened organic liquid composition of claim 1 wherein the monomer mixture comprises:
   30 to 55 wt % of the bicyclic (meth)acrylate ester, and
   45 to 70 wt % of the alkyl (meth)acrylate,
   up to a total of 100 wt %, wherein the weight percentages of the monomer are based on the total weight of all the monomers.

16. The thickened organic liquid composition of claim 1 wherein the at least one alkyl (meth)acrylate is butyl methacrylate and the bicyclic (meth)acrylate ester is isobornyl (meth)acrylate.

17. The thickened organic liquid composition of claim 16 wherein the monomer mixture comprises the butyl methacrylate in an amount of from 40 to 75 wt % and the isobornyl (meth)acrylate in an amount of from 25 to 60 wt %.

18. The thickened organic liquid composition of claim 16 wherein the monomer mixture comprises the butyl methacrylate in an amount of from 60 to 70 wt % and the isobornyl (meth)acrylate in an amount of from 30 to 40 wt %.

19. The thickened organic liquid composition of claim 16 wherein the monomer mixture consists of the butyl methacrylate in an amount of from 60 to 70 wt % and the isobornyl (meth)acrylate in an amount of from 30 to 40 wt %.

20. The thickened organic liquid composition of claim 16 wherein the monomer mixtures comprise the butyl methacrylate in an amount of 65 wt % and the isobornyl (meth)acrylate in an amount of from 35 wt %.

* * * * *